United States Patent
O'Donnell

(10) Patent No.: US 11,186,957 B2
(45) Date of Patent: Nov. 30, 2021

(54) SYSTEM AND METHOD FOR COLD PLANER CONTROL

(71) Applicant: Caterpillar Paving Products Inc., Brooklyn Park, MN (US)

(72) Inventor: Timothy M. O'Donnell, Long Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 161 days.

(21) Appl. No.: 16/047,603

(22) Filed: Jul. 27, 2018

(65) Prior Publication Data
US 2020/0032464 A1    Jan. 30, 2020

(51) Int. Cl.
| | |
|---|---|
| *E01C 19/00* | (2006.01) |
| *E01C 19/10* | (2006.01) |
| *G01S 19/14* | (2010.01) |
| *G01S 13/88* | (2006.01) |
| *E01C 23/088* | (2006.01) |

(52) U.S. Cl.
CPC ........ *E01C 19/004* (2013.01); *E01C 19/1063* (2013.01); *E01C 23/088* (2013.01); *G01S 13/885* (2013.01); *G01S 19/14* (2013.01)

(58) Field of Classification Search
CPC .. E01C 19/004; E01C 19/1063; E01C 23/088; G01S 19/14; G01S 13/885
See application file for complete search history.

(56) References Cited

U.S. PATENT DOCUMENTS

| | | | |
|---|---|---|---|
| 4,139,318 A * | 2/1979 | Jakob | E01C 23/088 404/90 |
| 6,755,263 B2 * | 6/2004 | Alft | E21B 7/06 175/61 |
| 8,180,590 B2 | 5/2012 | Szwilski et al. | |

(Continued)

FOREIGN PATENT DOCUMENTS

| | | |
|---|---|---|
| CA | 2394243 | 8/2001 |
| CN | 1073157173 | 11/2017 |

(Continued)

OTHER PUBLICATIONS

Hannes, Method for Mapping a Processing Area for Autonomous Robot Vehicles, 2020, European Patent Office (Year: 2015).*

*Primary Examiner* — Fadey S. Jabr
*Assistant Examiner* — Omar K Morsy
(74) *Attorney, Agent, or Firm* — Lee & Hayes, PLLC

(57) ABSTRACT

A method includes receiving information indicative of a cold planer travel path extending along a work surface, determining a mobile machine travel path extending along the work surface based at least partly on the information indicative of the cold planer travel path, and receiving sensor information associated with the work surface, wherein the sensor information is determined by at least one sensor of an autonomous mobile machine as the autonomous mobile machine traverses the mobile machine travel path. The method also includes generating a worksite map based at least partly on the sensor information, the worksite map identifying an object, wherein the object is disposed at least partly beneath a cut area to be formed by a cold planer, and controlling a position of a rotor of the cold planer, relative to the work surface and based at least partly on a location of the object identified in the worksite map.

20 Claims, 5 Drawing Sheets

(56) References Cited

U.S. PATENT DOCUMENTS

| | | |
|---|---|---|
| 9,377,528 B2 | 6/2016 | Birken et al. |
| 9,879,386 B2 | 1/2018 | Marsolek |
| 2013/0079999 A1* | 3/2013 | Killion ................ F02D 41/0205 |
| | | 701/50 |
| 2016/0188936 A1* | 6/2016 | Nunnink ................ G02B 26/12 |
| | | 235/462.22 |
| 2016/0265174 A1 | 9/2016 | Engelmann et al. |
| 2016/0297070 A1* | 10/2016 | Reigo .................. A01D 34/008 |
| 2017/0319426 A1* | 11/2017 | Dayal .................. G05D 1/0094 |
| 2018/0196438 A1* | 7/2018 | Newlin ................ G05D 1/0214 |
| 2018/0258595 A1 | 9/2018 | Berning et al. |
| 2019/0106862 A1* | 4/2019 | Ono ........................ E02F 3/764 |
| 2019/0178665 A1* | 6/2019 | Sakaida ................ G01C 21/20 |

FOREIGN PATENT DOCUMENTS

| | | | |
|---|---|---|---|
| CN | 206960648 | 2/2018 | |
| EP | 3234715 B1 * | 1/2019 | ........... G05D 1/0221 |

* cited by examiner

SYSTEM AND METHOD FOR COLD PLANER CONTROL

TECHNICAL FIELD

The present disclosure relates to a system for controlling the operation of a cold planer. More specifically, the present disclosure relates to a system configured to control the operation of a cold planer based at least in part on ground penetrating radar (GPR) information or other sensor information.

BACKGROUND

At a paving worksite, one or more pieces of paving equipment, such as a cold planer, can be used to remove a portion of a roadway, parking lot, or other such work surface in order to expose a paving surface. Once the portion of the work surface has been removed, a paving machine, such as an asphalt paver, may distribute, profile, and partially compact heated paving material (e.g., asphalt) onto the paving surface. One or more compaction machines may then be used to further compact the paving material until a desired paving material density has been reached.

Before removing portions of the work surface with the cold planer, it can be useful to identify the location of power lines, pipes, construction materials, or other items disposed beneath the work surface so that such items can be avoided by the cold planer. In particular, contacting such items with a rotor or other components of the cold planer during use can cause damage to such cold planer components, and may result in increased cold planer downtime. However, even if the locations of such objects are identified in advance, it may still be difficult for cold planer operators to avoid such objects when performing a milling operation on the work surface.

An example paving system is described in U.S. Pat. No. 9,879,386 (hereinafter referred to as the '386 patent). In particular, the '386 patent describes a system for coordinating operations of a cold planer and a paving machine at a worksite. The system described in the '395 patent also includes a sensor operable to generate a signal indicative of a position of the cold planer, a production monitoring system associated with the cold planer, and a communicating device operable to exchange information between the cold planer and the paver. The '386 patent does not, however, describe the use of sensor information or other information to assist in avoiding damage to a rotor of the cold planer, or to other cold planer components, during a milling operation.

Example embodiments of the present disclosure are directed toward improving upon the various paving systems described above.

SUMMARY

In an aspect of the present disclosure, a method includes receiving information indicative of a cold planer travel path, the cold planer travel path extending along a work surface, determining a mobile machine travel path extending along the work surface based at least partly on the information indicative of the cold planer travel path, and receiving sensor information associated with the work surface, wherein the sensor information is determined by at least one sensor of an autonomous mobile machine as the autonomous mobile machine traverses the mobile machine travel path. Such an example method also includes generating a worksite map based at least partly on the sensor information, the worksite map identifying an object, wherein the object is disposed at least partly beneath a cut area to be formed by a cold planer traversing the cold planer travel path, and controlling a position of a rotor of the cold planer, relative to the work surface and based at least partly on a location of the object identified in the worksite map, as the cold planer traverses at least a portion of the cold planer travel path.

In another aspect of the present disclosure, a paving system includes an autonomous mobile machine having a first sensor and a second sensor, and a cold planer having a rotor and a controller. In such examples, the controller is configured to determine a mobile machine travel path based at least partly on information indicative of a cut area to be formed by the cold planer, the mobile machine travel path extending along a work surface corresponding to the cut area, and provide the mobile machine travel path to the autonomous mobile machine via a network. The controller is also configured to receive sensor information associated with the work surface, wherein the sensor information is determined by the first sensor as the autonomous mobile machine traverses the mobile machine travel path, and receive location information determined by the second sensor, wherein the location information indicates locations of the autonomous mobile machine as the autonomous mobile machine traverses the mobile machine travel path. In such examples, the controller is further configured to generate a worksite map based at least partly on the sensor information and the location information, the worksite map identifying an object disposed at least partly beneath the cut area, and control a position of the rotor, relative to the work surface and based at least partly on a location of the object identified in the worksite map, as the cold planer traverses at least a portion of the cold planer travel path.

In yet another aspect of the present disclosure, a cold planer includes a rotor, a communication device, and a controller in communication with the communication device. In such examples, the controller is configured to determine a mobile machine travel path based at least partly on information indicative of a cut area to be formed by the cold planer, the mobile machine travel path extending along a work surface corresponding to the cut area, and provide the mobile machine travel path to the autonomous mobile machine with the communication device. The controller is also configured to receive, with the communication device, sensor information associated with the work surface, wherein the sensor information is determined by the first sensor as the autonomous mobile machine traverses the mobile machine travel path, and receive, with the communication device, location information determined by the second sensor, wherein the location information indicates locations of the autonomous mobile machine as the autonomous mobile machine traverses the mobile machine travel path. In such examples, the controller is further configured to generate a worksite map based at least partly on the sensor information and the location information, the worksite map identifying an object disposed at least partly beneath the cut area, and modify a position of the rotor, relative to the work surface and based at least partly on a location of the object identified in the worksite map, as the cold planer traverses at least a portion of the cold planer travel path.

DETAILED DESCRIPTION

Figure 1:
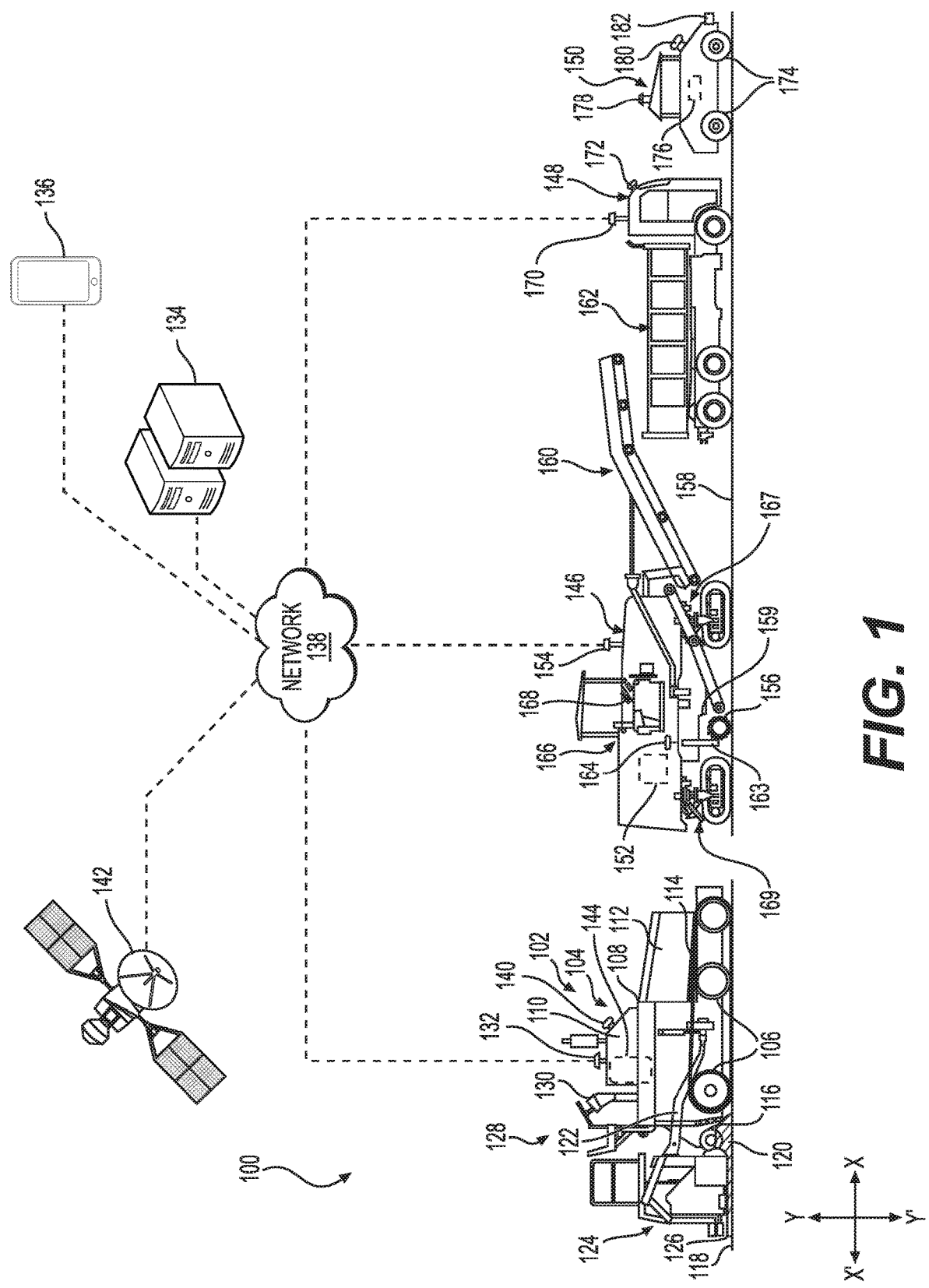
FIG. 1 is a perspective view of a system (e.g., a paving system) in accordance with an example embodiment of the present disclosure. The example system shown in FIG. 1 includes a cold planer and a mobile machine.

Wherever possible, the same reference numbers will be used throughout the drawings to refer to the same or like parts. FIG. 1 shows an example system 100 (e.g., a paving system 100) of the present disclosure. The example paving system 100 includes at least one example machine configured for use in one or more milling, excavating, hauling, compacting, paving, or other such processes. In particular, as will be described in greater detail below, the paving system 100 may include a cold planer, and separate mobile machine configured to traverse a portion of a work surface ahead of the cold planer. The mobile machine may comprise, for example, an autonomous mobile machine including one or more sensors configured to determine the presence and/or location of one or more objects disposed at least partly beneath the work surface. As will be described below, the mobile machine may communicate such information to a controller or other component of the cold planer, and the cold planer may modify and/or otherwise control the position of a rotor, relative to the work surface, based at least partly on such information. As a result of such a control methodology, contact between the rotor and such objects may be avoided, thereby lengthening the useful life of the rotor.

With reference to FIG. 1, the example paving system 100 may include a paving machine 102 which may be used for road or highway construction, parking lot construction, and other allied industries. Alternatively, the paving machine 102 may be any other machine used for depositing heated asphalt, concrete, or like materials. The paving machine 102 may include a tractor portion 104 supported on a set of ground-engaging elements 106. The tractor portion 104 may include a tractor frame 108, as well as a power source 110 for driving the ground-engaging elements 106. Although the ground engaging elements 106 are illustrated as wheels, it should be understood that the ground engaging elements 106 may be any other type of ground engaging elements such as, for example, continuous tracks, etc. The power source 110 may be a conventional internal combustion engine operating on fossil or hybrid fuels, or an electrically operated drive powered by alternate energy sources. The paving machine 102 may also include a hopper 112 for storing paving material. The paving machine 102 may further include a conveyor system 114 for conveying the paving material from the hopper 112 to other downstream components of the paving machine 102. For example, the paving machine 102 may include an auger assembly 116 which receives the paving material supplied via the conveyor system 114, and distributes the paving material onto a paving surface 118. Such paving material is illustrated as item 120 in FIG. 1. In such examples, the auger assembly 116 may be configured to distribute the paving material 120 across substantially an entire width of the paving machine 102.

The paving machine 102 may further include a tow arm 122 which couples a height adjustable screed portion 124 to the tractor portion 104. The tow arm 122 may be actuated by a hydraulic actuator, an electric actuator (not shown), and/or any other type of actuator as per application requirements, and raising or lowering the tow arm 122 may result in commensurate raising or lowering of the screed portion 124. The screed portion 124 may include one or more augers, rollers, and/or other components configured to assist in spreading and/or compacting the paving material 120 into a mat 126 on the paving surface 118. The screed portion 124 may also include first and second end gates configured to define the width of the mat 126.

Further referring to FIG. 1, an operator station 128 may be coupled to the tractor portion 104. The operator station 128 may include a console 130 and/or other levers or controls for operating the paving machine 102. For example, the console 130 may include a control interface for controlling various functions of the paving machine 102. The control interface may comprise an analog, digital, and/or touchscreen display, and such a control interface may be configured to display, for example, at least part of a map of the paving surface 118 and/or of the worksite generally, a travel path associated with the paving machine 102, one or more alerts, requests, or other information provided to an operator of the paving machine 102, boundaries, centerlines, or other information associated with a portion of the paving surface 118 acted on by one or more other machines of the paving system 100, and/or other information. The control interface may also support other functions including, for example, sharing various operating data with one or more other machines of the paving system 100. In some examples, a display of the control interface may be operable to display a worksite map that identifies at least part of a paving surface and/or one or more objects located beneath the paving surface.

As shown, the paving machine 102 may also include a communication device 132. Such communication devices 132 may be configured to permit wireless transmission of a plurality of signals, instructions, and/or information between the paving machine 102 and various other machines of the paving system 100. The communication device 132 may also be configured to permit wireless transmission of a plurality of signals, instructions, and/or information between the paving machine 102 and one or more servers, processors, computers, and/or other controllers 134, one or more tablets, computers, cellular/wireless telephones, personal digital assistants, mobile devices, or other electronic devices 136, and/or other components of the paving system 100. For example, such communication devices 132 may include a transmitter configured to transmit signals to a receiver of one or more other such communication devices 132. In such examples, each communication device 132 may also include a receiver configured to receive such signals. In some examples, the transmitter and the receiver of a particular communication device 132 may be combined as a transceiver or other such component. In any of the examples described herein, such communication devices 132 may enable communications between components of the paving system 100 via one or more networks 138. In such examples, the one or more controllers 134, electronic devise 136, and/or other components of the system 100 may be disposed at the worksite proximate the paving machine 102 and/or may be located remote from the worksite, such as at a paving material plant or at any other location.

The controller 134 illustrated in FIG. 1 may be located at the worksite proximate the paving machine 102, at a remote paving material plant, at a remote command center (not shown), and/or at any other location. In any of the examples described herein, the functionality of the controller 134 may be distributed so that certain operations are performed at the worksite and other operations are performed remotely. For example, some operations of the controller 134 may be performed at the worksite, on one or more of the paving machines 102, haul trucks, cold planers, and/or other components of the paving system 100. It is understood that the controller 134 may comprise a component of the paving system 100.

The controller 134 may be an electronic controller that operates in a logical fashion to perform operations, execute control algorithms, store and retrieve data and other desired operations. The controller 134 may include or access memory, secondary storage devices, processors, and any other components for running an application. The memory and secondary storage devices may be in the form of read-only memory (ROM) or random access memory (RAM) or integrated circuitry that is accessible by the controller 134. Various other circuits may be associated with the controller 134 such as power supply circuitry, signal conditioning circuitry, driver circuitry, and other types of circuitry.

The controller 134 may be a single processor or other device, or may include more than one controllers or processors configured to control various functions and/or features of the paving system 100. As used herein, the term "controller" is meant in its broadest sense to include one or more controllers, processors, and/or microprocessors that may be associated with the paving system 100, and that may cooperate in controlling various functions and operations of the components (e.g., machines) of the paving system 100. The functionality of the controller 134 may be implemented in hardware and/or software without regard to the functionality. The controller 134 may rely on one or more data maps relating to the operating conditions and the operating environment of the paving system 100 that may be stored in the memory of the controller 134. Each of these data maps may include a collection of data in the form of tables, graphs, and/or equations to maximize the performance and efficiency of the paving system 100 and its operation.

The one or more electronic devices 136 may also comprise components of the paving system 100. Such electronic devices 136 may comprise, for example, mobile phones, laptop computers, desktop computers, and/or tablets of project managers (e.g., foremen) overseeing daily paving operations at the worksite and/or at the paving material plant. Such electronic devices 136 may include and/or may be configured to access one or more processors, microprocessors, memory, or other components. In such examples, the electronic devices 136 may have components and/or functionality that is similar to and/or the same as the controller 134.

The network 138 may be a local area network ("LAN"), a larger network such as a wide area network ("WAN"), or a collection of networks, such as the Internet. Protocols for network communication, such as TCP/IP, may be used to implement the network 138. Although embodiments are described herein as using a network 138 such as the Internet, other distribution techniques may be implemented that transmit information via memory cards, flash memory, or other portable memory devices. The network 138 may implement or utilize any desired system or protocol including any of a plurality of communications standards. The desired protocols will permit communication between the controller 134, the electronic devices 136, the various communication devices 132 described herein, and/or any other desired machines or components of the paving system 100. Examples of wireless communications systems or protocols that may be used by the paving system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the components of the paving system 100 (e.g., between machines). In other instances, the communications may be automatically routed without the need for re-transmission by remote personnel.

In example embodiments, one or more machines of the paving system 100 (e.g., the paving machine 102) may include a location sensor 140 configured to determine a location and/or orientation of the respective machine. In such embodiments, the communication device 132 of the respective machine may be configured to generate and/or transmit signals indicative of such determined locations and/or orientations to, for example, the controller 134, one or more of the electronic devices 136, and/or to the other respective machines of the paving system 100. In some examples, the location sensors 140 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 140 described herein may comprise a GPS receiver, transmitter, transceiver, laser prisms, and/or other such device, and the location sensor 140 may be in communication with one or more GPS satellites 142 and/or UTS to determine a respective location of the machine to which the location sensor 140 is connected continuously, substantially continuously, or at various time intervals. One or more additional machines of the paving system 100 may also be in communication with the one or more GPS satellites 142 and/or UTS, and such GPS satellites 140 and/or UTS may also be configured to determine respective locations of such additional machines. In any of the examples described herein, machine locations determined by the respective location sensors 140 may be used by the controller 134, one or more of the electronic devices 136, and/or other components of the paving system 100 to coordinate activities of the paving machine 102, one or more cold planers, and/or other components of the paving system 100. For example, machine locations determined by the respective location sensors 140 may be used by the controller 134 and/or other components of the paving system 100 to determine the coordinates and/or other location information of objects that may be disposed beneath a cut area to be formed by the cold planer and/or beneath a work surface of the worksite at which the cold planer is being used. As a result of identifying the location of such objects, the travel path, rotor position, and/or other operating parameters of the paving machine 102, cold planer, and/or other components of the paving system 100 may be modified to avoid damage thereto. Such control methods will be described in greater detail below.

The paving machine 102 may also include a controller 144 operably connected to and/or otherwise in communication with the console 130, the communication device 132, and/or other components of the paving machine 102. The controller 144 may be a single controller or multiple controllers working together to perform a variety of tasks. The controller 144 may embody a single or multiple processors, microprocessors, field programmable gate arrays (FPGAs), digital signal processors (DSPs), and/or other components configured to calculate and/or otherwise determine one or more travel paths of the paving machine 102, screed settings, and/or other operational constraints of the paving machine 102 based at least in part on information received from the one or more other machines of the paving system 100, paving machine operating information received from an operator of the paving machine 102, one or more signals received from the GPS satellites 142, and/or other information. Numerous commercially available processors or microprocessors can be configured to perform the functions of the controller 144. Various known circuits may be associated with the controller 144, including power supply circuitry, signal-conditioning circuitry, actuator driver circuitry (i.e., circuitry powering solenoids, motors, or piezo actuators), and communication circuitry. In some embodiments, the controller 144 may be positioned on the paving machine 102, while in other embodiments the controller 144 may be positioned at an off-board location and/or remote location relative to the paving machine 102. The present disclosure, in any manner, is not restricted to the type of controller 144 or the positioning of the controller 144 relative to the paving machine 102. In any of the examples described herein, the location information, boundary information, travel paths, operating information, screed settings, and/or any other information determined, processed, or generated by the controller 144 may be provided to the one or more additional components of the paving system 100, the controller 134, and/or electronic devices 136 via the network 138. Similarly, any of the information received by the controller 144 may be received via the network 138 and/or the communication device 132.

As shown in FIG. 1, the paving system 100 may further include one or more cold planers 146, one or more haul trucks 148, and/or one or more mobile machines (e.g., rovers) 150. In such examples, a cold planer 146 may include a controller 152 that is substantially similar to and/or the same as the controller 144 described above with respect to the paving machine 102. In such examples, the controller 152 of the cold planer 146 may be in communication with the controller 144 of the paving machine 102 via the network 138. For example, the cold planer 146 may include a communication device 154 configured to send information to the communication device 132 of the paving machine 102 and/or receive information from the communication device 132 of the paving machine 102 via the network 138.

The cold planer 146 may further include one or more rotors 156 having ground-engaging teeth, bits, or other components configured to remove at least a portion of the roadway, pavement, asphalt, concrete, gravel, dirt, sand, or other materials of a work surface 158 on which the cold planer 146 is disposed. For example, in any of the examples described herein, the cold planer 146 may include a single rotor 156 that may be lowered in a substantially downward direction (e.g., in a direction Y') into contact with the work surface 158 by the cold planer 146. In such examples, the rotor 156 of the cold planer 146 may be rotated in a clockwise and/or counterclockwise direction relative to a frame 159 of the cold planer 146 as respective ground-engaging teeth, bits, or other components of the rotor 156 contact the work surface 158 to remove a portion thereof and to reveal the paving surface 118. Alternatively, in some examples the rotor 156 may comprise a first rotor 156 of the cold planer 146. In such examples, the cold planer 146 may also include a second rotor (not shown) located opposite the first rotor 156. In such example embodiments the first and second rotors may be lowered in the substantially downward direction (e.g., in the direction Y') into contact with the work surface 158 by the cold planer 146, and may be rotated in a clockwise and/or counterclockwise direction relative to the frame 159 of the cold planer 146 as respective ground-engaging teeth, bits, or other components of the first and second rotors are in contact with the work surface 158. As a result of such rotation, in combination with force applied to the work surface 158 by the one or more rotors of the cold planer 146 in a substantially downward direction, portions of the work surface 158 may be removed by the cold planer 146 to reveal the paving surface 118. The cold planer 146 may also include a conveyor system 160 connected to the frame 159, and configured to transport removed portions of the work surface 158 from proximate the rotor 156 (or from proximate the first and second rotors) to a bed 162 of the haul truck 148.

Additionally, the cold planer 146 may include an actuator assembly 163 connected to the frame 159 and configured to move the rotor 156 (or to move the first and second rotors) relative to the frame 159 as the rotor 156 removes portions of the work surface 158. For example, the actuator assembly 163 may include one or more hydraulic cylinders, pneumatic cylinders, stepper motors, solenoids, or other actuation devices connected to the frame 159, and configured to move the rotor 156 in response to control signals received from the controller 152. In such examples, the actuator assembly 163 may also include one or more hydraulic fluid pumps, pneumatic pumps, drivers, electrical circuits, and/or other components configured to assist in controllably moving the rotor 156. In some examples, the actuator assembly 163 may be configured to pivot and/or rotate the rotor 156 in a direction Y, the direction Y', a direction X, a direction X', a direction Z (FIG. 2), and/or a direction Z' (FIG. 2) relative to the frame 159 and/or relative to the work surface 158. In such examples, the actuator assembly 163 may provide the rotor 156 with six or more degrees of freedom relative to the frame 159 and/or relative to the work surface 158. Additionally or alternatively, the actuator assembly 163 may be configured to raise the rotor 156 in the direction Y, away from the work surface 158 and toward the frame 159, in response to a first signal from the controller 152. The actuator assembly 163 may also be configured to lower the rotor 156 in the direction Y', toward the work surface 158 and away from the frame 159, in response to a second signal from the controller 152. In such examples, movement of the rotor 156 in the direction Y and/or in the direction Y' may comprise substantially linear movement of the rotor 156 relative to the frame 159. Additionally or alternatively, the actuator assembly 163 may be configured to raise and lower first and second ends of the rotor 156 relative to the frame 159, and/or relative to the work surface 158, in response to control signals from the controller 152. For example, in response to a first signal from the controller 152, the actuator assembly 163 may be configured to raise a first axially outermost end (e.g., a left-hand side) of the rotor 156 in the direction Y, while maintaining a position of a second axially outermost end (e.g., a right-hand side) of the rotor 156 opposite the first end relatively constant relative to the frame 159, in order to avoid contact with one or more objects disposed beneath the work surface 158. Once the cold planer 146 has moved past the object along a cold planer travel path, the actuator assembly 163 may, in response to a second signal from the controller 152, lower the first axially outermost end (e.g., the left-hand side) of the rotor 156 in the direction Y'. In further examples, the actuator assembly 163 may be controlled to raise and lower the second axially outermost end of the rotor 156 in a similar manner. Controlling the positon of the rotor 156 in this way may enable the cold planer 146 to make a side-slope cut and/or any other contoured cut on or into the work surface 158.

In addition to and/or in place of the actuator assembly 163 associated with the rotor 156, the cold planer 146 may include a front actuator assembly 167 and a rear actuator assembly 169. In such examples, the front actuator assembly 167 may be connected to the frame 159, and configured to raise and/or lower one or more wheels, continuous tracks, or other ground engaging elements (disposed at the front of the cold planer 146) relative to the frame 159. Similarly, the rear actuator assembly 169 may be connected to the frame 159, and configured to raise and lower one or more wheels, continuous tracks, or other ground engaging elements (disposed at the rear of the cold planer 146) relative to the frame 159. In some examples, the front actuator assembly 167 may be controlled by the controller 152 to operate in conjunction with the rear actuator assembly 169, while in other examples, the front actuator assembly 167 and the rear actuator assembly 169 may be controlled to operate independently by the controller 152. In any of the examples described herein, at least one of the front actuator assembly 167 and the rear actuator assembly 169 may include one or more hydraulic cylinders, pneumatic cylinders, stepper motors, solenoids, or other actuation devices connected to the frame 159, and configured to raise and/or lower the one or more ground engaging elements of the cold planer 146 relative to the frame 159 in response to control signals received from the controller 152. Raising and/or lowering the ground engaging elements in this way may, as a result, raise and/or lower the frame 159 and the rotor 156 relative to, for example, the work surface 158. Thus, similar to the actuator assembly 163, in any of the examples described herein at least one of the front actuator assembly 167 and the rear actuator assembly 169 may be configured to change, modify, vary, and/or otherwise control the position of the rotor 156 relative to, for example, the work surface 158, in response to a control signal received from the controller 152. For instance, at least one of the front actuator assembly 167 and the rear actuator assembly 169 may be configured to raise at least part of the frame 159 in the direction Y, relative to the work surface 158, thereby raising the rotor 156 in the direction Y relative to the work surface 158, in response to a first control signal received from the controller 152. Additionally, the at least one of the front actuator assembly 167 and the rear actuator assembly 169 may be configured to lower at least part of the frame 159 in the direction Y', relative to the work surface 158, thereby lowering the rotor 156 in the direction Y' relative to the work surface 158, in response to a second control signal received from the controller 152. Accordingly, in some examples in which the cold planer 146 includes at least one of the front actuator assembly 167 and the rear actuator assembly 169, the actuator assembly 163 associated with the rotor 156 may be omitted. It is also understood that independent control of various hydraulic cylinders or other components of at least one of the front actuator assembly 167 and the rear actuator assembly 169 may enable the cold planer 146 to make a side-slope cut and/or any other contoured cut on or into the work surface 158.

As shown in FIG. 1, the cold planer 146 may further include one or more GPS sensors or other like location sensor 164 configured to determine a location of the cold planer 146 and/or components thereof. In example embodiments, a location sensor 164 connected to the frame 159 of the cold planer 146 may be configured to determine GPS coordinates (e.g., latitude and longitude coordinates), grid coordinates, a map location, and/or other information indicative of the location of the cold planer 146, in conjunction with the one or more GPS satellites 142 described above. In such examples, the controller 152 of the cold planer 146 and/or the controller 144 of the paving machine 102 may determine corresponding GPS coordinates of the axially outermost edges (e.g., a left edge and a right edge) of the rotor 156 based at least in part on the information (e.g., GPS coordinates) indicative of the location of the cold planer 146. Any of the processes described herein with respect to the cold planer 146 may be repeated by the controller 152 of the cold planer 146, the controller 134, the electronic devices 136, and/or other components of the paving system 100 for each new/updated set of GPS coordinates or other information indicative of the current location of the cold planer 146 as the cold planer 146 traverses a cold planer travel path extending along the work surface 158.

As will be described in greater detail below, the controller 152 of the cold planer 146 may use such information to determine a travel path of the cold planer 146 along the paving surface 118, to determine, control, and/or change a position of the rotor 156 relative to the frame 159 of the cold planer 146 and/or relative to the work surface 158, and/or to otherwise assist in controlling the operation of the cold planer 146. For example, in some situations the cold planer 146 may form a cut area having a substantially uniform depth and a substantially uniform width. In such examples, the depth of the cut area may be measured and/or may otherwise extend substantially vertically downward from a top surface of the work surface 158. The width of the cut area, as will be illustrated in FIG. 2, may be measured and/or may otherwise extend substantially horizontally across the work surface 158, and may extend substantially perpendicularly from the outer boundaries of the work surface 158.

Additionally, in some examples the actuator assembly 163 of the cold planer 146 may be controlled to raise the height of the rotor 156, thereby decreasing the depth of the cut area, when the cold planer 146 is traversing a portion of a cold planer travel path proximate an object that is disposed at least partly beneath the cut area and/or the work surface 158. In other examples, at least one of the front actuator assembly 167 and the rear actuator assembly 169 may be controlled to raise, lower, and/or otherwise control the positon of the rotor 156 relative to the work surface 158. Controlling the position of the rotor 156 in this way may avoid damage to the rotor 156 that would be caused by the rotor 156 contacting the object. In still further examples, additionally or alternatively, the cold planer 146 may momentarily stop operation (e.g., come to a complete stop, stop rotation of the rotor 156, etc.), change a direction of travel, and/or alter its current travel path in order to avoid contacting the object with the rotor 156.

The cold planer 146 may also include an operator station 166, and the operator station 166 may include a console 168 and/or other levers or controls for operating the cold planer 146. In some examples, the operator station 166 and/or the console 168 may be substantially similar to the operator station 128 and console 130 described above with respect to the paving machine 102. For example, the console 168 may include a control interface for controlling various functions of the cold planer 146. The control interface may comprise an analog, digital, and/or touchscreen display, and such a control interface may be configured to display, for example, at least part of a map of the work surface 158 and/or of the worksite generally, a travel path associated with the cold planer 146, boundaries, centerlines, or other information associated with a portion of the work surface 158 to be acted on by the cold planer 146, a worksite map that identifies the location, size, and/or other parameters of objects disposed beneath the cut area and/or the work surface 158, one or more alerts, warnings, requests, or other information provided to an operator of the cold planer 146 and associated with such objects, and/or other information. The control interface may also support other functions including, for example, sharing various operating data with one or more other machines of the paving system 100.

With continued reference to FIG. 1, the haul truck 148 may comprise any on-road or off-road vehicle configured to transport paving material 120, removed portions of the work surface 158, and/or other construction materials to and from a worksite. For instance, similar to the cold planer 146 and the paving machine 102, the haul truck 148 may include a set of wheels or other ground-engaging elements, as well as a power source for driving the ground-engaging elements. The power source may be a conventional internal combustion engine operating on fossil or hybrid fuels, or an electrically operated drive powered by alternate energy sources. As noted above, the haul truck 148 may include a bed 162 configured to receive removed portions of the work surface 158 from the cold planer 146 and/or to transport paving material 120. The haul truck 148 may also include a plurality of hydraulic cylinders or other components configured to controllably raise and lower the bed 162 to facilitate loading or unloading of material carried by the bed 162.

In addition, the haul truck 148 may include a communication device 170 and a location sensor 172. The communication device 170 may be substantially similar to and/or the same as the communication devices 132, 154 described above, and the location sensor 172 may be substantially similar to and/or the same as the location sensors 140, 164 described above. In some examples, the communication device 170 and/or the location sensor 172 may be operably and/or otherwise connected to a controller (not shown) of the haul truck 148. In such examples, the controller of the haul truck 148 may be substantially similar to and/or the same as the controllers 144, 152 described above.

The mobile machine 150 may comprise any on-road or off-road vehicle configured to controllably traverse a portion of the work surface 158 ahead of the cold planer 146. For example, the mobile machine 150 may comprise an all-terrain vehicle, rover, or other like machine configured to make multiple passes along the work surface 158 and in accordance with a desired travel path. The mobile machine 150 may include a set of wheels, tracks, or other ground-engaging elements 174, as well as a power source for driving the ground-engaging elements 174. The power source may be a conventional internal combustion engine operating on fossil or hybrid fuels, or an electrically operated drive powered by alternate energy sources. The mobile machine 150 may also include a controller 176, and the controller 176 of the mobile machine 150 may be substantially similar to and/or the same as the controllers 144, 152 described above. In addition, the mobile machine 150 may include a communication device 178 and a location sensor 180. The communication device 178 may be substantially similar to and/or the same as the communication devices 132, 154 described above, and the location sensor 180 may be substantially similar to and/or the same as the location sensors 140, 164 described above. In some examples, the communication device 178 and/or the location sensor 180 may be operably and/or otherwise connected to the controller 176 of the mobile machine 150.

In any of the embodiments described herein, the respective controllers of the paving machine 102, the cold planer 146, the haul truck 148, the mobile machine 150, and/or other components of the paving system 100 may be operable to control the respective components of the paving system 100 in a manual mode, a semi-autonomous mode, and/or a fully-autonomous mode of operation. In an example fully-autonomous mode of operation, the controller of the respective paving system component may control, at least in part, steering, speed, acceleration, deceleration, rotor height, rotor speed, screed operation, and/or other functions of the paving system component without input from an operator. In such examples, the mobile machine 150 may comprise an autonomous mobile machine 150. In an example semi-autonomous mode of operation, the controller of the respective paving system component may control one or more such functions, at least in part, without input from the operator, but in such a mode of operation, the operator may be able to assist or override instructions from the controller before or during performance of such functions. In an example manual mode of operation, the operator may manually control performance of such functions, but the controller of the respective paving system component may be called upon to periodically and/or temporarily control the performance of such functions (e.g., controlling speed of a component of the paving system 100 on "cruise control").

Figure 2:
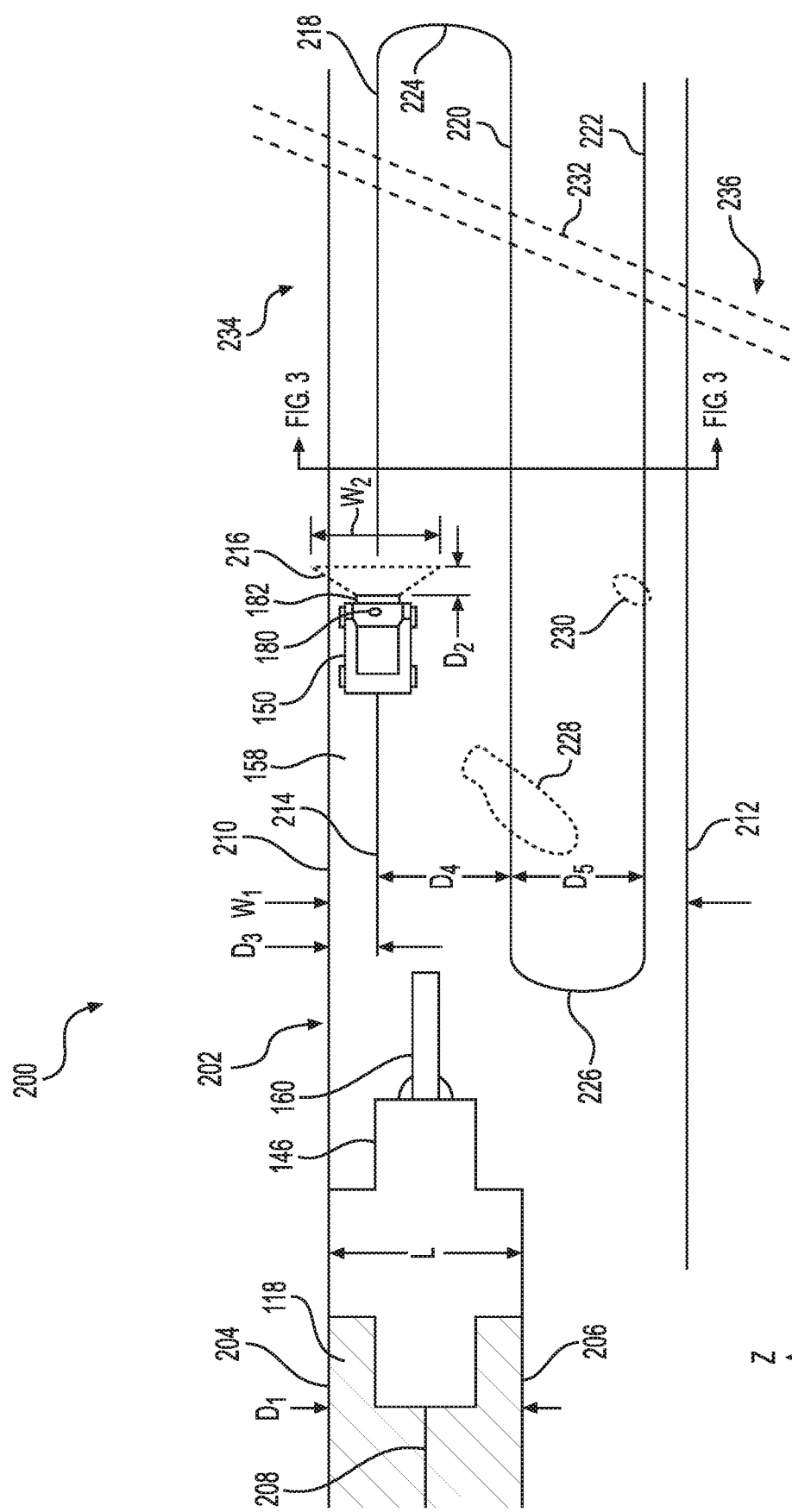
FIG. 2 is a schematic illustration of a cold planer and a mobile machine traversing a work surface, in accordance with an example embodiment of the present disclosure.

As shown in FIG. 1, the mobile machine 150 may also include at least one sensor 182 configured to determine sensor information associated with the work surface 158. In such examples, the sensor 182 may comprise a single sensor, multiple sensors, or an array of sensors, and each respective at least one sensor 182 may be configured to sense, capture, detect, and/or otherwise determine respective sensor information associated with the work surface 158. For example, in some embodiments the sensor 182 may comprise at least one ground-penetrating RADAR (GPR) carried by the mobile machine 150. An example GPR and other object detection devices are described in co-owned U.S. patent application Ser. No. 14/641,989 (published on Sep. 15, 2016 as U.S. Patent Application Publication No. 2016/0265174), the entire disclosure of which is incorporated herein by reference. In some examples, such a GPR may comprise a radio detection and ranging device including a transmitter configured to emit electromagnetic waves in the radio or microwave domain. Such a GPR may also include a receiving antenna and/or other receiving device configured to receive electromagnetic waves reflected by an object, and a processor configured to determine one or more properties of the object. In such examples, the GPR may be configured to determine a distance from the GPR to a surface (e.g., at least an uppermost surface) of the object reflecting the electromagnetic waves emitted by the GPR. In such examples, the GPR may be configured to determine a distance in the direction Y' from, for example, the sensor 182 and/or from the work surface 158 to at least an uppermost surface of an object disposed beneath the cut area and/or below the work surface 158. As will be described with respect to at least FIG. 2, the sensor 182 (e.g., the GPR) may have a field of view that extends at least partly in the direction X, and the field of view may have a width extending at least partly in the direction Z (FIG. 2). Moreover, the sensor 182 may be positioned such that the field of view (e.g., the field of view of the GPR) may extend downward (e.g., toward the work surface 158) in the direction Y'. Positioning the sensor 182 in this way may enable the sensor 182 to determine the presence of an object disposed beneath the cut area and/or below the work surface 158, and/or to determine a distance between the work surface 158 and at least an uppermost surface of such an object.

Additionally or alternatively, the sensor 182 may comprise one or more digital cameras, video cameras, thermal sensors, or other image capture devices. In an example embodiment, the sensor 182 may comprise an array of image capture devices configured to sense, capture, detect, and/or otherwise determine sensor information comprising one or more visual images of the work surface 158 as the mobile machine 150 traverses a mobile machine travel path extending along the work surface 158. Such visual images may comprise, for example, still images, moving images (e.g., video), thermal images, infrared images, and/or other images. In such examples, the controller 176 may be configured to receive sensor information determined by the sensor 182, and to identify and/or classify one or more objects included in such images. In such examples, the controller 176 may employ one or more object recognition algorithms or other programs to assist in identifying and/or classifying such objects. Additionally or alternatively, the sensor 182 may comprise one or more magnetic sensors (e.g., a magnetometer) configured to emit and/or otherwise direct an electromagnetic field toward the work surface 158, and to determine a disturbance in the emitted electromagnetic field caused by an object disposed beneath the cut area and/or below the work surface 158. Such a magnetic sensor may be configured to determine the presence of such an object, and/or to determine a distance between the work surface 158 and at least an uppermost surface of such an object.

In any of the examples described herein, the controller 152 of the cold planer 146, the controller 134, the electronic device 136, and/or any of the other controllers described herein may be configured to determine a cold planer travel path, a mobile machine travel path, a worksite map, a position of the rotor 156, and/or other operating parameters of one or more components of the paving system 100 through extrapolation, using one or more trigonometric algorithms, using one or more neural networks and/or machine learning algorithms, using fuzzy logic, using one or more look-up tables, and/or through one or more additional methods. In an example embodiment, the controller 152 of the cold planer 146, the controller 134, the electronic device 136, and/or any of the other controllers described herein may have an associated memory in which various extrapolation models, trigonometric algorithms, machine learning algorithms, look-up tables, and/or other components may be stored for determining such operating parameters based at least partly on one or more inputs. Such inputs may include, for example, a paving plan and/or other information indicative of the cold planer travel path. For example, as will be described below, the controller 152 of the cold planer 146 may receive such a paving plan from an operator of the cold planer 146, from a foreman, and/or from one or more other sources. The controller 152 may determine a cold planer travel and/or a mobile machine travel path based at least partly on such information. The controller 152 may receive sensor information from the at least one sensor 182, and/or may receive location information from the location sensor 180. In such examples, the controller 152 may generate a worksite map based at least partly on the sensor information, and the worksite map may identify an object disposed at least partly beneath a cut area to be formed by the cold planer 146. Further, in such examples the controller 152 may maintain, change, and/or otherwise control the position of the rotor 156 (e.g., relative to the frame 159 of the cold planer 146 and/or relative to the work surface 158) based at least partly on a location of the object identified in the worksite map as the cold planer 146 traverses at least a portion of the cold planer travel path. For instance, the controller 152 may control the actuator assembly 163 to move the rotor 156 in the direction Y as the cold planer 146 approaches a location proximate (e.g., prior to) the location of the object. In further examples, at least one of the front actuator assembly 167 and the rear actuator assembly 169 may raise the frame 159 relative to the work surface 158 (e.g., in the direction Y), thereby moving the rotor 156 in the direction Y, as the cold planer 146 approaches a location proximate (e.g., prior to) the location of the object. In this way, contact between the rotor 156 and the object may be avoided, as well as potential damage to the rotor 156 caused by such contact.

FIG. 2 illustrates an example worksite 200 including a cut area 202 to be formed by an example cold planer 146 on a work surface 158 of the present disclosure. In such examples, the cut area 202 may be formed by the cold planer 146 on the work surface 158 to reveal the paving surface 118, and an example paving machine 102 (FIG. 1) may be operated to deposit paving material 120 (e.g., a mat 126) on the paving surface 118 and within the cut area 202. FIG. 2 also illustrates the example cold planer 146 traversing at least a portion of an example cold planer travel path, and an example mobile machine 150 traversing at least a portion of a mobile machine travel path. It is understood that any of the operations described with respect to FIGS. 2-4 may be performed by the cold planer 146 and/or by the mobile machine 150 in an autonomous operating mode, in a semi-autonomous operating mode, and/or in a manual operating mode.

As shown in FIG. 2, the cold planer 146 may have a width L in the direction Z. In such examples, the width L may comprise and/or may be substantially equal to an axial length of the rotor 156 (FIG. 1), and the width L may define the width $D_1$ of the portion of the work surface 158 removed by the cold planer 146 as the cold planer 146 traverses the work surface 158. For example, the rotor 156 of the cold planer 146 may remove a top layer and/or any other portion of the work surface 158, and the removed portion of the work surface 158 may include a first boundary 204 (e.g., a right-hand side boundary) and a second boundary 206 (e.g., a left-hand side boundary) disposed opposite and substantially parallel to the first boundary 204. In such examples, a cold planer travel path 208 extending along the work surface 158 and/or otherwise associated with the cut area 202 may extend substantially centrally (e.g., longitudinally) through the removed portion of the work surface 158 (e.g., substantially centrally between the first boundary 204 and the second boundary 206).

In any of the examples described herein, the cold planer travel path 208 may comprise a line, travel envelope, and/or other path traversed by the cold planer 146 along the work surface 158 when forming the cut area 202. In such examples, the cut area 202 may have a substantially vertical depth (e.g., a depth in the direction Y' shown in FIG. 1) between approximately 2 inches and approximately 4 inches. In further examples, the depth of the cut area 202 may be greater than approximately 4 inches or less than approximately 2 inches depending on the requirements of the paving operation being performed on the work surface 158. It is understood that any of the depths, dimensions, or other configurations of the cut area 202 described herein are merely examples, and such configurations should not be interpreted as limiting the present disclosure in any way.

As shown in FIG. 2, an example cut area 202 to be formed by the cold planer 146 may include a first boundary 210 (e.g., a right-hand side boundary) and a second boundary 212 (e.g., a left-hand side boundary) disposed opposite and substantially parallel to the first boundary 210. Additionally, a width $W_1$ of the cut area 202 may extend in the direction $Z'$ from the first boundary 210 to the second boundary 212, and the width $W_1$ may be substantially equal to a maximum cutting span of the cold planer 146. In additional examples, on the other hand, an example cut area 202 of the present disclosure may include one or more widths, shapes, features, contours, and/or other configurations formed by cold planer 146 as the cold planer 146 is controlled to traverse the work surface 158 in more than one pass and/or according to one or more additional (e.g., non-linear) travel paths. As noted above, in some examples, the cold planer 146 may include a single rotor 156, and in such examples, the width $W_1$ of the cut area 202 may be substantially equal to the width L (e.g., the axial distance between a first end of the rotor 156 and a second end of the rotor 156 opposite the first end thereof). Alternatively, in examples in which the cold planer 146 includes two rotors, the width $W_1$ of the cut area 202 may be substantially equal to the axial (e.g., longitudinal) distance between a first end of a first rotor, and a second end of a second rotor disposed opposite the first end of the first rotor.

In example embodiments, the controller 152 of the cold planer 146, the controller 134, the electronic device 136, and/or any other controllers described herein may receive information indicative of the cold planer travel path 208, and may determine, among other things, a mobile machine travel path 214 extending along the work surface 158 based at least partly on such information. In such examples, the mobile machine travel path 214 may comprise a line, travel envelope, and/or other path traversed by the mobile machine 150 along the work surface 158 ahead of the cold planer 146 and/or while determining various characteristics of the work surface 158. Additionally, in such examples the information indicative of the cold planer travel path 208 may comprise a paving plan or other set of information/instructions. Such a paving plan may include, among other things, a first plurality of sequential GPS coordinates indicative of the location and/or extent of the first boundary 210, a second plurality of sequential GPS coordinates indicative of the location and/or extent of the second boundary 212, the desired depth in the direction $Y'$ (substantially constant and/or variable) of the cut area 202, a desired density of the paving material mat 126 to be formed on the paving surface 118, and/or other information. Such information may be entered, programmed, and/or otherwise received from an electronic device 136 used by a foreman of the worksite 200, a paving material plant operator or other remote control center operator having access to the controller 134, an operator of the cold planer 146, or other operators associated with the worksite 200. In some examples, the paving plan may include a third plurality of sequential GPS coordinates indicative of the location and/or extent of the cold planer travel path 208. Alternatively, in further examples the controller 152 of the cold planer 146 and/or other controllers described herein may calculate, estimate, and/or otherwise determine the cold planer travel path 208 based on the width L of the cold planer 146 and/or of the rotor 156, as well as the location of the first boundary 210 and the second boundary 212. For example, in some embodiments the width L of the cold planer 146 may be substantially equal to the desired width $W_1$ of the cut area 202 specified in the paving plan. Accordingly, the determined cold planer travel path 208 may extend substantially centrally between the first boundary 210 and the second boundary 212. Alternatively, the width L of the cold planer 146 may be less than the desired width $W_1$ of the cut area 202 specified in the paving plan. In such examples, the controller 152 may determine a first cold planer travel path spaced a first distance from the first boundary 210, and a second cold planer travel path spaced a second distance from the second boundary 212. In such examples, the cold planer 146 may traverse the first cold planer travel path during a first pass along the work surface 158, and may traverse the second cold planer travel path during a second pass along the work surface 158, in order to form the cut area 202 having such a desired width $W_1$.

In any of the examples described herein, the controller 152 and/or other controllers of the paving system 100 may determine the mobile machine travel path 214 based at least partly on the information described above. For example, in some embodiments the controller 152 may determine the location and/or extent of the first boundary 210 and the second boundary 212 based at least partly on the width L and/or the cold planer travel path 208. In other examples, as noted above, the paving plan may include a first plurality of sequential GPS coordinates indicative of the location and/or extent of the first boundary 210, a second plurality of sequential GPS coordinates indicative of the location and/or extent of the second boundary 212. In either such example, the controller 152 may determine a mobile machine travel path 214 configured such that the at least one sensor 182 of the mobile machine 150 may sense, detect, collect, and/or otherwise determine sensor information associated with the work surface 158 prior to the cold planer 146 traversing the portions of the work surface associated with the mobile machine travel path 214. For example, mobile machine travel path 214 may be configured such that the at least one sensor 182 of the mobile machine 150 may sense, detect, collect, and/or otherwise determine sensor information associated with the cut area 202 to be formed by the cold planer 146.

In such examples, the controller 152 may determine the mobile machine travel path 214 based at least partly on the shape, length, width, depth, extent, angle, and/or other configurations of a field of view 216 of the sensor 182. It is understood that the sensor 182 may have a substantially conical, substantially cube-shaped, and/or any other type (e.g., shape) of field of view. As shown in FIG. 2, in some examples the field of view 216 may have a width $W_2$ in the direction Z and/or in the direction $Z'$. Additionally or alternatively, the field of view 216 may extend a distance $D_2$ from the sensor 182 in the direction X. Further, as noted above, in some examples (e.g., examples in which the sensor 182 comprises a GPR) the field of view 216 may extend in the direction $Y'$ to facilitate sensing, detecting, and/or identifying one or more objects disposed at least partly beneath the work surface 158 and/or the cut area 202 to be formed by the cold planer 146.

In any of the examples described herein, the controller 152 may determine the mobile machine travel path 214 based at least partly on the width $W_2$ (in the direction Z and/or in the direction $Z'$) of the field of view 216 and/or the width $W_1$ of the cut area 202 to be formed by the cold planer 146. For example, the controller 152 may determine a mobile machine travel path 214 comprising a single pass in embodiments in which the width $W_2$ of the field of view 216 is greater than or equal to the width $W_1$ of the cut area 202 to be formed by the cold planer 146. In such examples, the sensor 182 may be configured to determine sensor information associated with the entire work surface 158 in a single pass. Alternatively, in examples in which the width $W_2$ of the field of view 216 is less than the width $W_1$ of the cut area 202 to be formed by the cold planer 146, the controller 152 may determine a mobile machine travel path 214 comprising two or more passes such that the entire work surface 158 associated with the cut area 202 to be formed by the cold planer 146 may be scanned and/or otherwise sensed by the sensor 182 before the cold planer 146 traverses the portion of the work surface 158 corresponding to the mobile machine travel path 214. Such an example mobile machine travel path 214 is illustrated in FIG. 2. For instance, the example mobile machine travel path 214 includes a first pass 218 spaced from the first boundary 210 by a distance $D_3$, a second pass 220 adjacent to the first pass 218 and spaced from the first pass 218 by a distance $D_4$, and a third pass 222 adjacent to the second pass 218 and spaced from the second pass 220 by a distance $D_5$. Such an example mobile machine travel path 214 also includes a first turn 224 connecting the first pass 218 with the second pass 220, and a second turn 226 connecting the second pass 220 with the third pass 222. In further example embodiments, the mobile machine travel path 214 may include greater than or less than three passes depending on the width $W_2$ of the field of view 216 and/or the width $W_1$ of the cut area 202 to be formed by the cold planer 146. Further, in some examples the width $W_2$ of the field of view 216 may be less than approximately 30 inches, and the depth (e.g., extending from the sensor 182 in the direction Y' shown in FIG. 1) may be greater than approximately 18 inches. In additional examples, on the other hand, the width $W_2$ of the field of view 216 may be greater than or equal to approximately 30 inches, and the depth (e.g., extending from the sensor 182 in the direction Y' shown in FIG. 1) may be less than or equal to approximately 18 inches. It is understood that any of the dimensions and/or other configurations of the field of view 216 described above are merely examples, and such dimensions and/or other configurations are not intended to limit the present disclosure in any way. Additionally, while the first turn 224 and the second turn 226 are represented as "U-turns," in further examples, the mobile machine 150 may be configured to make "K-turns" or "S-turns" in order to travel along adjacent passes of the mobile machine travel path 214. For example, the mobile machine 150 may be configured to traverse the first pass 218 in the direction X, and to perform an S-turn at the end of the first pass 218 by directionally shifting across the work surface 158 in substantially the direction Z' (e.g., without turning around). In such an example, the mobile machine 150 may traverse the second pass 220, in reverse, in the direction X'.

Configuring the mobile machine travel path 214 in this way may assist in enabling the sensor 182 to sense, detect, identify, and/or otherwise determine the presence of one or more objects disposed at least partly beneath the work surface 158 and/or the cut area 202 to be formed by the cold planer 146. For example, the mobile machine travel path 214 may be positioned, shaped, and/or otherwise configured such that the field of view 216 overlays and/or extends beyond the first boundary 210 and/or the second boundary 212. In some examples, the field of view 216 may overlay and/or extend beyond the first boundary 210 of the cut area 202 when the mobile machine 150 traverses the first pass 218 of the mobile machine travel path 214. Additionally, the field of view 216 may overlay and/or extend beyond the second boundary 212 of the cut area 202 when the mobile machine 150 traverses the second pass 220, the third pass 222, or an additional pass (not shown) of the mobile machine travel path 214. In any such examples, the sensor 182 may determine sensor information indicative of the presence, location, identity, material composition, shape, size, and/or other configurations or characteristics of an object disposed at least partly beneath the work surface 158 and/or the cut area 202. FIG. 2 illustrates a first object 228, a second object 230, and a third object 232. It is understood that in further examples, greater than or less than three objects may be identified by the sensor 182. Also, while some objects (e.g., the first object 228 and the second object 230) may be disposed substantially within the cut area 202 (e.g., substantially between the first boundary 210 and the second boundary 212), in some examples, at least one object may be disposed in an area 234 outside of the cut area 202 and adjacent to the first boundary 210. Additionally or alternatively, in some examples at least one object may be disposed in an area 236 outside of the cut area 202 and adjacent to the second boundary 212. At least one of the first object 228 and the second object 230 may comprise a manhole cover, a sewer grate, a rock, a pipe cap, and/or any other metallic, cast, polymeric, or other object. As illustrated in FIG. 2, the example third object 232 may comprise an underground pipe, drainage line, electrical cable, water line, piece of rebar, I-beam, metal stud, or other structure extending beneath the cut area 202 from the area 234 to the area 236. In any of the examples described herein, contact between the rotor 156 and the first object 228, the second object 230, the third object 232, or other buried objects may cause damage to the rotor 156. Accordingly, the mobile machine 150 and/or other components of the paving system 100 may be configured to assist the cold planer 146 in avoiding such contact as the cold planer 146 forms the cut area 202.

Figure 3:
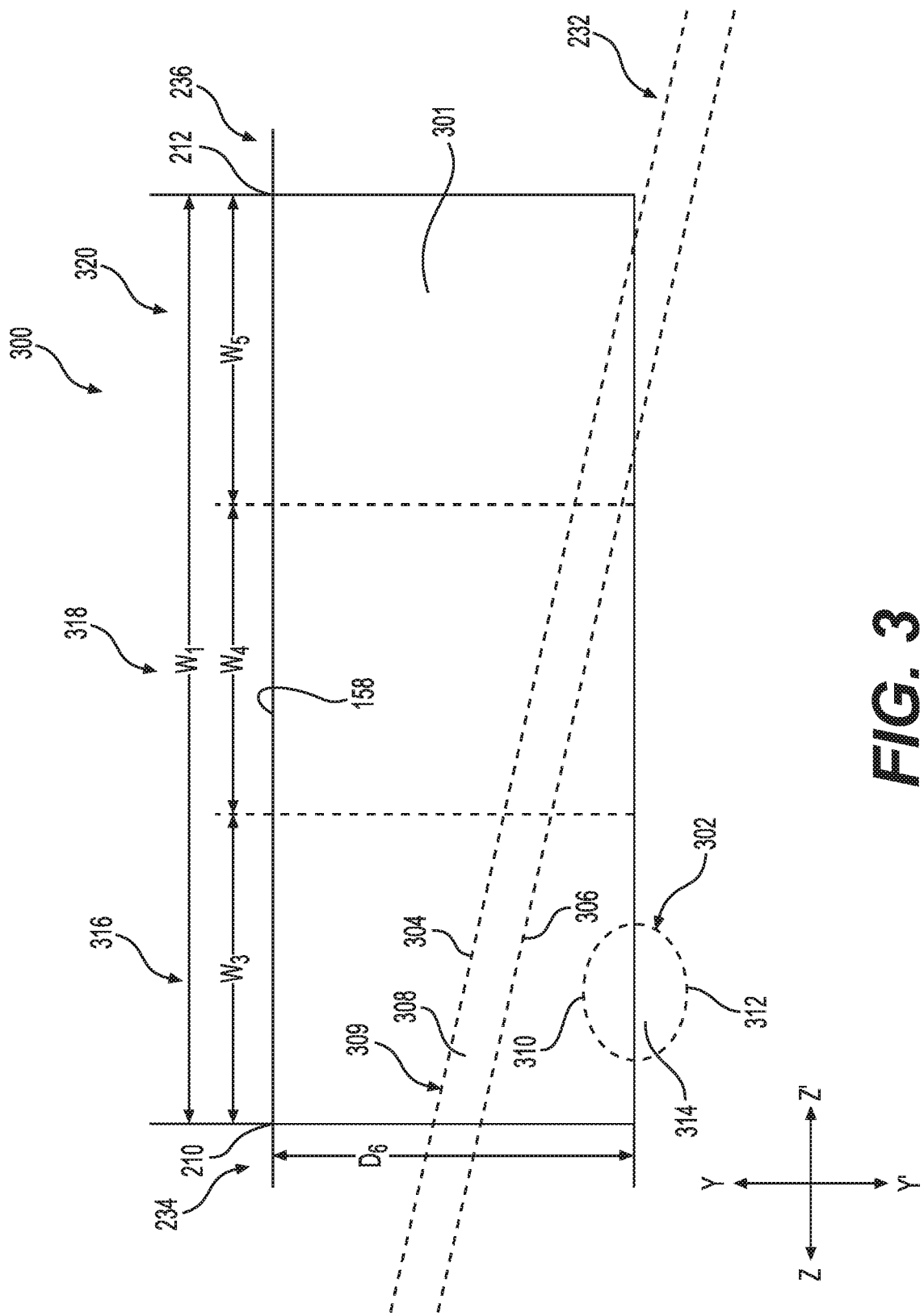
FIG. 3 is a cross-sectional view of a portion of an example cut area to be formed by a cold planer, in accordance with another example embodiment of the present disclosure.

FIG. 3 illustrates a cross-sectional view of a portion 300 of the cut area 202 described above with respect to FIG. 2. In particular, the portion 300 of the cut area 202 shown in FIG. 3 may represent a portion of the cut area 202 that is within the field of view 216 of the sensor 182 as the mobile machine 150 traverses the first pass 218, the second pass 220, and the third pass 222 of the mobile machine travel path 214. Such an example portion 300 of the cut area 202, as sensed by the sensor 182, may include dirt, gravel, stone, paving material, concrete, and/or other material 301 forming at least part of the work surface 158 and/or portions of the earth disposed beneath the work surface 158. In the example illustrated in FIG. 3, such a portion 300 may have a depth $D_6$ in the direction Y' that is equal to and/or that corresponds to a depth of the field of view 216 of the sensor 182 in the direction Y'. Additionally, the portion 300 may have a width that is greater than or equal to and/or that corresponds to the width $W_1$ of the cut area 202 (FIG. 2). For instance, as noted above the portion 300 may represent and/or comprise a portion of the cut area 202 that is within the field of view 216 of the sensor 182 as the mobile machine 150 traverses one or more passes of the mobile machine travel path 214. In the example embodiment shown in FIG. 3, the total width of the portion 300 may comprise the cumulative sum of a width $W_3$ of the field of view 216 of the sensor 182 as the mobile machine 150 traverses the first pass 218 along the work surface 158, a width $W_4$ of the field of view 216 of the sensor 182 as the mobile machine 150 traverses the second pass 220 along the work surface 158, and a width $W_5$ of the field of view 216 of the sensor 182 as the mobile machine 150 makes the third pass 218 along the work surface 158. In such examples, at least one of the width $W_3$, width $W_4$, or width $W_5$ may be substantially equal to the width $W_2$ described above with respect to the field of view 216 shown in FIG. 2.

In such examples, the sensor 182 may sense, detect, and/or otherwise identify the first object 228, the second object 230, the third object 232, and/or any of the other objects described above that are disposed at least partly within the portion 300. In such examples, a fourth object 302 disposed at least partly beneath the third object 232 may or may not be sensed, detected, and/or otherwise identified by the sensor 182. For example, in embodiments in which the sensor 182 comprises a GPR, the sensor 182 may direct electromagnetic waves in the direction Y', and may receive electromagnetic waves reflected by the third object 232. In such examples, the sensor 182 may be configured to determine a distance from the sensor 182 and/or from the work surface 158 to a surface 304 (e.g., at least an uppermost surface) of the third object 232 reflecting the electromagnetic waves emitted by the sensor 182. As shown in FIG. 3, in some examples the third object 232 may also comprise a surface 306 (e.g., a bottom surface), a surface 308 (a first side), and/or a surface 309 (a second side). In some examples, the third object 232 may be substantially cylindrical and/or any other cross-sectional shape. In such examples, the sensor 182 may be configured to detect electromagnetic waves emitted by the sensor 182 and reflected by the surface 304, the surface 308, and/or the surface 309. Accordingly, the sensor 182 may be configured to determine a shape, size, orientation, and/or distance associated with the surface 304, the surface 308, and/or the surface 309. However, in examples in which electromagnetic waves emitted by the sensor 182 do not impinge upon the surface 306 (e.g., the bottom surface), such electromagnetic waves will not be reflected by the surface 306, and thus, will not be detected by the sensor 182. As a result, the sensor 182 may not be capable of determining a shape, size, orientation, and/or distance associated with the surface 306. Similarly, while the fourth object 302 may include a surface 310 (e.g., an uppermost surface), a surface 312 (e.g., a bottom surface), and a surface 314 (e.g., a side surface), in some examples at least a portion of the third object 232 may be disposed between the sensor 182 and one or more of the surface 310, the surface 312, or the surface 314. In such examples, one or more of the surface 310, the surface 312, or the surface 314 of the fourth object 302 may be at least partly blocked from receiving electromagnetic waves emitted by the sensor 182 by a portion of the third object 232. As a result, the portions of one or more of the surface 310, the surface 312, or the surface 314 blocked from receiving electromagnetic waves by the third object 232 may not be sensed, identified, and/or otherwise detected by the sensor 182.

It is also understood that depending on the shape, size, length, width, height, identity, orientation, and/or other configuration of one or more objects disposed beneath the work surface 158 and/or the cut area 202 to be formed by the cold planer 146, such an object may be detected by the at least one sensor 158 as the mobile machine 150 traverses sequential passes of the mobile machine travel path 214. For example, in the embodiment illustrated in FIG. 3, the third object 232 may have a length and/or orientation resulting in the third object 232 spanning across the entire portion 300 (e.g., from the area 234 to the area 236). In such examples, the sensor 182 may sense, detect, and/or otherwise determine a location, orientation, shape, size, and/or other configuration of a first portion of the third object 232 as the mobile machine 150 traverses the first pass 218 along the work surface 158. Such configurations of the first portion of the third object may be determined by the sensor 182 across, along, and/or within a section 316 of the portion 300 corresponding to the width $W_3$ of the field of view 216. In particular, the sensor 182 may determine respective distances in the direction Y' between the sensor 182 and/or the work surface 158 and substantially all points along the surface 304, the surface 308, the surface 309, and/or other surfaces of the third object 232 positioned to reflect electromagnetic waves emitted by the sensor 182 within the section 316. As shown in FIG. 3, in some examples the third object 232 may be shaped, angled, positioned, oriented, and/or otherwise configured such that respective distances in the direction Y' between the sensor 182 and/or the work surface 158 and substantially all points along the surface 304, the surface 308, the surface 309, and/or other surfaces of the third object 232 may vary, in the direction Z', across the width $W_3$ corresponding to the section 316. The sensor 182 may determine similar respective distances in the direction Y' as the mobile machine 182 traverses substantially the entire mobile machine travel path 214. For example, the sensor 182 may determine such distances as the mobile machine 182 traverses the first pass 218, the first turn 224, the second pass 220, the second turn 226, and/or the third pass 222. In such examples, the location sensor 180 may also determine corresponding location information (e.g., GPS coordinates, UTS coordinates, etc.) of the mobile machine 150 and corresponding to the respective distances in the direction Y'. Accordingly, the above process may be performed throughout substantially the entire work surface 158 and/or cut area 202 to be formed by the cold planer 146. Such respective distances in the direction Y' may be used by the controller 152 to determine, for example, whether to change the position of the rotor 156 relative to the work surface 158 (e.g., whether to move the rotor 156 in the direction Y relative to the work surface 158) in order to avoid contact with an object.

Figure 4:
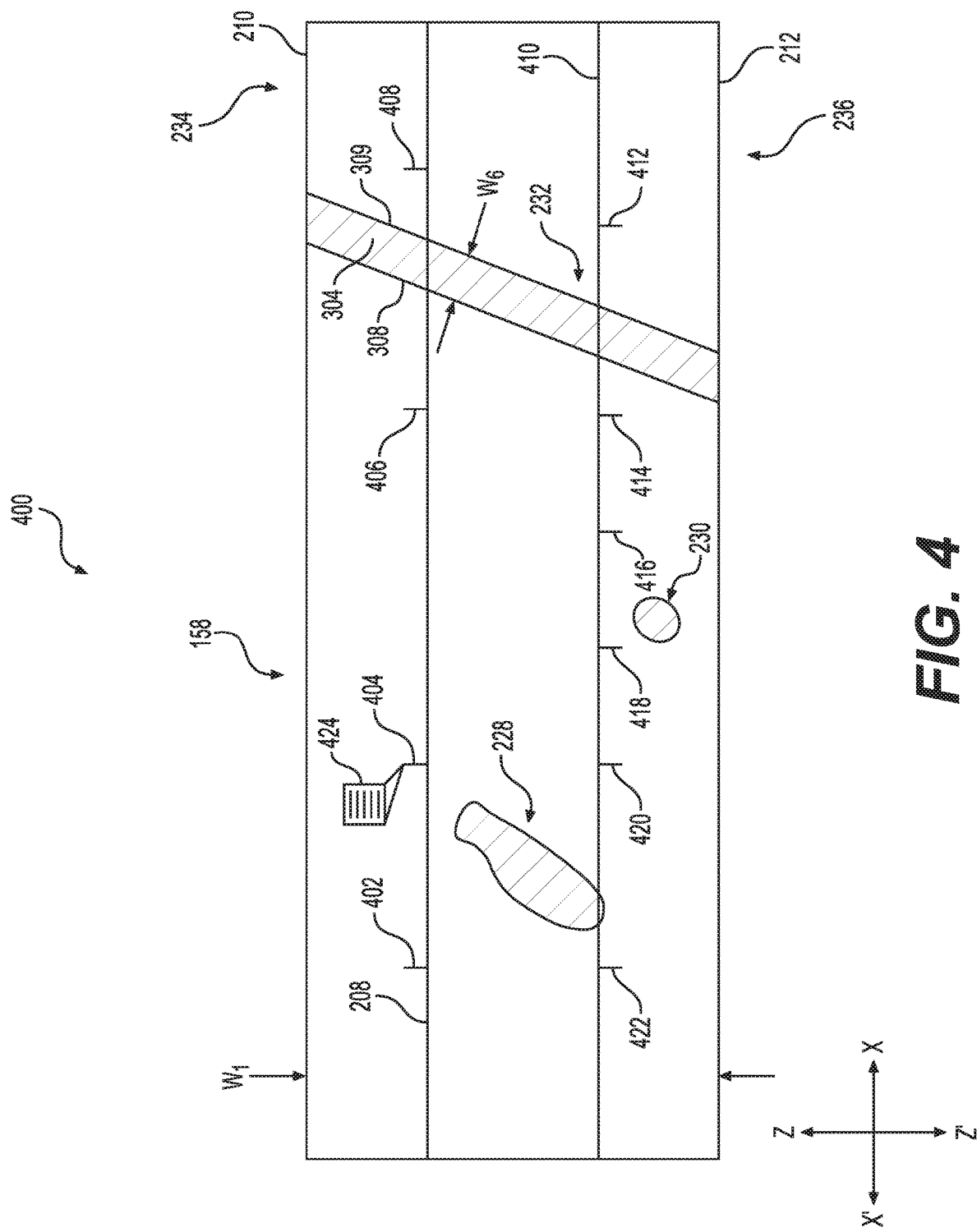
FIG. 4 illustrates a visualization of an example worksite map, in accordance with still another example embodiment of the present disclosure.

FIG. 4 illustrates a visualization of an example worksite map 400 of the present disclosure. The visualization of the example worksite map 400 shown in FIG. 4 corresponds to the worksite 200 shown in FIG. 2. It is understood that an example worksite map 400 of the present disclosure may comprise one or more text files, data files, video files, digital image files, and/or other electronic files providing information indicative of the cut area 202 to be formed by the cold planer 146, the work surface 158 on which the cut area 202 will be formed, the cold planer travel path 208, the mobile machine travel path 214, one or more objects disposed at least partly beneath the cut area 202, and/or other aspects of a particular worksite 200. For example, the worksite map 400 may include location information comprising a first plurality of GPS coordinates indicating a location and/or extent of the first boundary 210 of the cut area 202, and a second plurality of GPS coordinates, indicating a location and/or extent of the second boundary 212 of the cut area 202. The worksite map 400 may also include a plurality of GPS coordinates indicating respective locations of one or more objects (e.g., the first object 228, the second object 230, the third object 232, etc.) disposed at least partly beneath the work surface 158 and/or the cut area 202, and/or other information indicating respective distances in the direction Y' between the sensor 182 and/or the work surface 158 and substantially all points along one or more surfaces of such objects. For example, the worksite map 400 may include a plurality of GPS coordinates indicating respective locations of substantially all points along the surface 304, the surface 308, and/or the surface 309 of the third object 232. Such GPS coordinates may assist the controller 152 of the cold planer 146 in determining a width $W_6$, length, height, angle, orientation, and/or other configuration of the third object 232. Additionally or alternatively, the worksite map 400 may include respective distances in the direction Y' between the sensor 182 and/or the work surface 158 and substantially all points along, for example, the surface 304, the surface 308, and/or the surface 309 of the third object 232. The worksite map 400 may also include GPS coordinates indicating respective locations of substantially all points along corresponding surfaces of the first object 228 and/or the second object 230.

In still further examples, the worksite map 400 may include location information indicative of the cold planer travel path 208 and/or of the mobile machine travel path 214. For example, the worksite map 400 may include a plurality of GPS coordinates indicating a location and/or extent of the cold planer travel path 208 extending along the work surface 158. In some examples, the worksite map 400 may also indicate various locations along the cold planer travel path 208 at which a position of the rotor 156 should be changed and/or otherwise modified relative to the frame 159 of the cold planer 146. For example, the worksite map 400 may include first GPS coordinates indicating a first location 402 along the cold planer travel path 208 at which the rotor 156 should be raised, in a direction away from the work surface 158, in order to avoid contact with an object disposed at least partly beneath the cut area 202. In such examples, the worksite map 400 may also include second GPS coordinates indicating a second location 404 along the cold planer travel path 208 at which the rotor 156 may be lowered, in a direction toward the work surface 158, after the rotor 156 and/or the cold planer 146 has moved past such an object.

As shown in FIG. 4, an example visualization of the worksite map 400 may comprise a still image, a video image (e.g., a real-time video image), a graphical representation, a graphical user interface (GUI), and/or other visual representation of the worksite map 400 and its components. Such a visualization of the worksite map 400 may be presented to an operator of the cold planer 146 via a display or other component of the console 168, to a foreman via a display or other component of the electronic device 136, to paving plant personnel via one or more displays operably connected to the controller 134, and/or to any other individuals via one or more displays or other devices described herein. Such a visualization may include, for example, one or more two-dimensional images (as shown in FIG. 4) and/or one or more three-dimensional images illustrative of information included in the worksite map 400. Further, such a visualization of the worksite map 400 may include visual indicia indicative of one or more of the items described above. For instance, an example visualization of the worksite map 400 may include one or more lines, patterns, markings, images, icons, and/or other visual indicia of the cold planer travel path 208, the work surface 158, the cut area 202 to be formed by the cold planer 146, and/or of one or more objects (e.g., first object 228, second object 230, third object 232, etc.) disposed at least partly beneath the work surface 158 and/or the cut area 202. Although not illustrated in FIG. 4, in some examples, a visualization of the worksite map 400 may also include an image, icon, and/or other visual indicia representing the cold planer 146, the mobile machine 150, at least one haul truck 148, a paving machine 102, and/or any other component of the paving system 100 located at the worksite 200. In the example embodiment of FIG. 4, a visualization of the worksite map 400 may further include one or more hashmarks, lines, arrows, markings, images, icons, and/or other visual indicia indicating the first location 402 along the cold planer travel path 208 at which the rotor 156 should be raised (e.g., in the direction Y) in order to avoid contact with the first object 228, and the second location 404 along the cold planer travel path 208 at which the rotor 156 may be safely lowered (e.g., in the direction Y'). In the example embodiment of FIG. 4, a visualization of the worksite map 400 may also include one or more hashmarks, lines, arrows, markings, images, icons, and/or other visual indicia indicating a third location 406 along the cold planer travel path 208 at which the rotor 156 should be raised (e.g., in the direction Y) in order to avoid contact with the third object 232, and a fourth location 408, along the cold planer travel path 208 and beyond the third object 232, at which the rotor 156 may again be safely lowered (e.g., in the direction Y').

It is understood that the example visualization of the worksite map 400 shown in FIG. 4 illustrates a cold planer travel path 208 including a first pass associated with the first location 402, the second location 404, the third location 406, and the fourth location 408. In such examples, the cold planer travel path 208 may also include a second pass 410 in which the cold planer 146 may traverse the work surface 158 in the direction X'. Accordingly, the example visualization of the worksite map 400 may include one or more lines, patterns, markings, images, icons, and/or other visual indicia of the second pass 410. In the example embodiment of FIG. 4, a visualization of the worksite map 400 may further include one or more hashmarks, lines, arrows, markings, images, icons, and/or other visual indicia indicating a fifth location 412 along the second pass 410 of the cold planer travel path 208 at which the rotor 156 should be raised (e.g., in the direction Y) in order to avoid contact with the third object 232, and a sixth location 414 along the second pass 410 at which the rotor 156 may be safely lowered (e.g., in the direction Y'). In the example embodiment of FIG. 4, a visualization of the worksite map 400 may also include one or more hashmarks, lines, arrows, markings, images, icons, and/or other visual indicia indicating a seventh location 416 along the second pass 410 at which the rotor 156 should be raised (e.g., in the direction Y) in order to avoid contact with the second object 230, an eighth location 418, along the second pass 410 and beyond the second object 230, at which the rotor 156 may again be safely lowered (e.g., in the direction Y'), one or more hashmarks, lines, arrows, markings, images, icons, and/or other visual indicia indicating a ninth location 420 along the second pass 410 at which the rotor 156 should be raised (e.g., in the direction Y) in order to avoid contact with the first object 228, and a tenth location 422, along the second pass 410 and beyond the first object 228, at which the rotor 156 may again be safely lowered (e.g., in the direction Y'). While the visualization of the worksite map 400 has been described herein as including various visual indicia associated with, for example, the first object 228, the second object 230, the third object 232, a first location 402, a second location 404, and/or other items, in further examples, a worksite map and/or a visualization thereof, may include greater than, less than, and/or different visual indicia than those described above with respect to the worksite map 400. The information included in such worksite maps and/or the visual indicia included in the example visualizations of such worksite maps, may correspond to the shape, size, dimensions, and/or other configurations of the cut area 202 and/or the work surface 158, as well as the shape, size, orientation, quantity, and/or configuration of one or more objects disposed at least partly beneath the cut area 202 and/or the work surface 158.

In any of the examples described herein, one or more visualizations of the worksite map 400 may be output, displayed, and/or otherwise provided via the console 168 of the cold planer 146, via the electronic device 136, and/or via any additional display or corresponding device of the paving system 100. Additionally, in such examples, the visualization of the worksite map 400 may comprise an interactive GUI generated and/or otherwise provided by a display (e.g., a touch screen or other touch-sensitive display) of the console 168. For instance, one or more of the visual indicia described above and included in the visualization of the worksite map 400 (e.g., in a GUI presented by a touch screen of the present disclosure and illustrating a visualization of the worksite map 400) may be responsive to touch input, and/or other input provided by an operator of the cold planer 146 during operation. In such examples, an input provided by the operator may result in the display of one or more pop-up windows or any other icon 424 providing information associated with the portion of the visualization of the worksite map 400 corresponding to the input. FIG. 4 illustrates an example in which an operator of the cold planer 146 provided an input (e.g., a touch input via a touch screen of the console 168) proximate, and/or corresponding to the visual indicia indicating the second location 404 along the cold planer travel path 208. In response to such an input, the controller 152 of the cold planer 146 may cause the console 168 to display and/or otherwise output the icon 424 providing the GPS coordinates and/or other location information identifying the second location 404. In such examples, the icon 424 may also include one or more instructions to the operator, including, for example, an indication that the rotor 156 may be safely lowered in the direction Y'. In still further examples, the icon 424 may provide information indicating the location, configuration, identity, and/or other characteristics of, for example, the first object 228 and/or another object with which the visual indicia of the second location 404 is associated. In other examples, the icon 424, and/or the visualization of the worksite map 400 generally, may comprise an image providing a side or elevation cross-sectional view (e.g., as seen from the direction Z) illustrating the material 301, the rotor 156, the work surface 158, and/or one or more of the objects described above (e.g., the first object 228). Such an image may illustrate a length of the work surface 158 in, for example, the direction X, the depth of the rotor 156, the depth and/or location of at least part of (e.g., a top surface of) the one or more objects (e.g., the first object 228), and/or other information relevant to operating the cold planer 146. In additional examples, the icon 424, and/or the visualization of the worksite map 400 generally, may comprise an image providing a front or elevation cross-sectional view (e.g., as seen from the direction X) illustrating the material 301, the rotor 156, the work surface 158, and/or one or more of the objects described above (e.g., the first object 228). Such an example front or elevation cross-sectional view (e.g., as seen from the direction X) may be similar to (e.g., taken from the same vantage point as) the view shown in FIG. 3. Providing example visualizations of the worksite map 400 described above may assist an operator in controlling the cold planer 146, and may also assist the operator in avoiding contact between the rotor 156 and one or more of the objects described above. As a result, the worksite map 400 described herein with respect to FIG. 4 may assist in reducing damage to the rotor 156, thereby extending the useful life of the rotor 156 and minimizing downtime of the cold planer 146.

Figure 5:
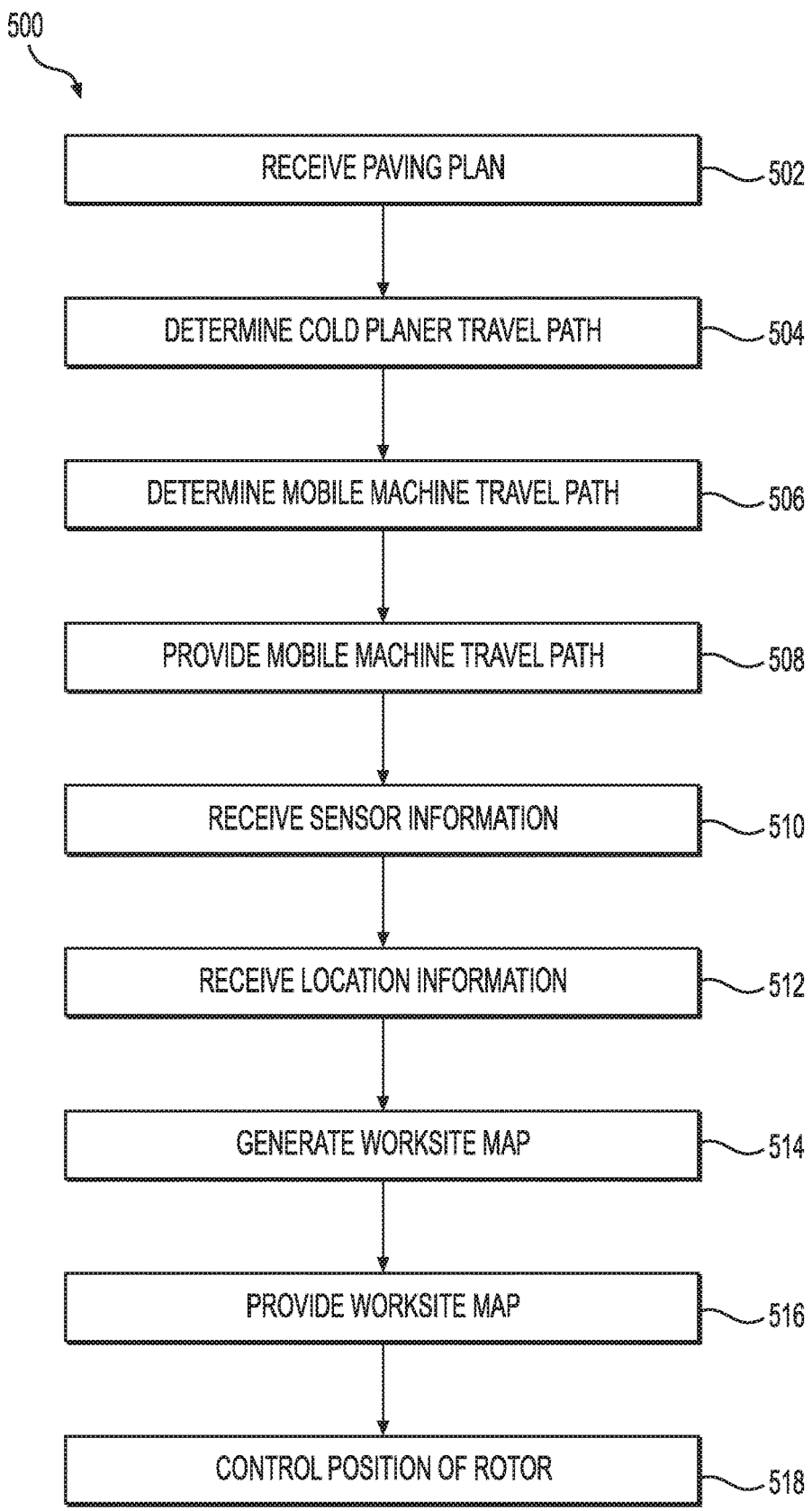
FIG. 5 is a flow chart depicting a method of controlling the operation of a cold planer in accordance with an example embodiment of the present disclosure.

FIG. 5 illustrates a flow chart depicting a method 500 in accordance with an example embodiment of the present disclosure. The example method 500 is illustrated as a collection of steps in a logical flow diagram, which represents operations that can be implemented in hardware, software, or a combination thereof. In the context of software, the steps represent computer-executable instructions stored in memory. When such instructions are executed by, for example, the controller 152 of the cold planer 146, the controller 134, the electronic device 136, and/or other components of the paving system 100, such instructions may cause the controller 152, the cold planer 146, the mobile machine 150, and/or various components of the paving system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 500 is described with reference to the paving system 100, the cold planer 146, the mobile machine 150, and/or the paving machine 102 of FIG. 1. In particular, unless otherwise noted, the method 500 will be described below with respect to the controller 152. As noted above, in further example embodiments, any of the operations of the method 500 may be performed by the controller 176, the controller 134, the electronic device 136, the controller 144, and/or by other components of the paving system 100, either alone or in combination.

At 502, the controller 152 of the cold planer 146 may receive various information from one or more sources associated with the paving system 100. For example, at 502 the controller 152 may receive a paving plan corresponding to the worksite 200. Such a paving plan may include, among other things, a first plurality of sequential GPS coordinates (e.g., latitude and longitude coordinates) indicative of the location and/or extent of the first boundary 210 of a cut area 202, a second plurality of sequential GPS coordinates (e.g., latitude and longitude coordinates) indicative of the location and/or extent of the second boundary 212 of the cut area 202, a desired depth in the direction Y' (substantially constant and/or variable) of the cut area 202, a desired density of a paving material mat 126 to be formed on the paving surface 118, and/or other information. Such information may be entered, programmed, and/or otherwise received from an electronic device 136 used by a foreman of the worksite 200, a paving material plant operator or other remote control center operator having access to the controller 134, an operator of the cold planer 146, or other operators associated with the worksite 200. In some examples, the paving plan received at 502 may include a third plurality of sequential GPS coordinates indicative of the location and/or extent of the cold planer travel path 208. In any of the examples described herein, the paving plan or other set of information/instructions received at 502 may comprise information indicative of a cold planer travel path 208 extending along the work surface 158.

At 504, the controller 152 may calculate, estimate, and/or otherwise determine the cold planer travel path 208. In examples in which the paving plan received at 502 includes a third plurality of sequential GPS coordinates indicative of the location and/or extent of the cold planer travel path 208, determining the cold planer travel path 208 at 504 may comprise mapping and/or identifying such a path based on the third plurality of sequential GPS coordinates. Alternatively, at 504 the controller 152 may calculate, extrapolate, and/or otherwise determine the cold planer travel path 208 based on a known width L of the cold planer 146 and/or of the rotor 156, as well as the location of the first boundary 210 and the location of the second boundary 212. For example, in some embodiments the width L of the cold planer 146 may be substantially equal to the desired width $W_1$ of the cut area 202 specified in the paving plan. Accordingly, the controller 152 may determine a cold planer travel path 208 extending substantially centrally between the first boundary 210 and the second boundary 212. Alternatively, the width L of the cold planer 146 may be less than the desired width $W_1$ of the cut area 202 specified in the paving plan. In such examples, at 504 the controller 152 may determine a first cold planer travel path spaced a first distance (e.g., in the direction Z') from the first boundary 210, and a second cold planer travel path spaced a second distance (e.g., in the direction Z) from the second boundary 212.

At 506, the controller 152 may calculate, estimate, and/or otherwise determine the mobile machine travel path 214 based at least partly on the paving plan and/or other information received at 502. For example, in some embodiments the controller 152 may determine the location and/or extent of the first boundary 210 and the second boundary 212 based at least partly on the width L and/or the cold planer travel path 208. In other examples, as noted above, the paving plan may include a first plurality of sequential GPS coordinates indicative of the location and/or extent of the first boundary 210, a second plurality of sequential GPS coordinates indicative of the location and/or extent of the second boundary 212. In either such example, at 506 the controller 152 may determine a mobile machine travel path 214 configured such that the at least one sensor 182 of the mobile machine 150 may sense, detect, collect, and/or otherwise determine sensor information associated with the work surface 158 prior to the cold planer 146 traversing the portions of the work surface 158 associated with the mobile machine travel path 214. In such examples, the controller 152 may determine the mobile machine travel path 214 at 506 based at least partly on the shape, length, width, depth, extent, angle, and/or other configurations of a field of view 216 of the sensor 182.

For example, at 506 the controller 152 may determine the mobile machine travel path 214 based at least partly on the width $W_2$, in the direction Z and/or in the direction Z', of the field of view 216. In such examples the controller 152 may determine a mobile machine travel path 214 comprising a single pass in embodiments in which the width $W_2$ of the field of view 216 is greater than or equal to the width $W_1$ of the cut area 202 to be formed by the cold planer 146. Alternatively, in examples in which the width $W_2$ of the field of view 216 is less than the width $W_1$ of the cut area 202 to be formed by the cold planer 146, the controller 152 may determine a mobile machine travel path 214 at 506 comprising two or more passes. In such examples, the mobile machine travel path 214 determined at 506 may comprise a number of passes along the work surface 158, and determining the mobile machine travel path 214 at 506 may include determining the number of passes included in the mobile machine travel path 214 based at least partly on the width $W_2$ of the field of view 216 and the width $W_1$ of the cut area 202 to be formed by the cold planer 146. In some examples, the controller 152 may determine the number and/or location of the passes included in the mobile machine travel path by dividing the width $W_1$ of the cut area 202 by the width $W_2$ of the field of view 216.

At 508, the controller 152 may provide the mobile machine travel path determined at 506 to the mobile machine 150 via the network 138. For example, as noted above, the mobile machine 150 may include a controller 176 and a communication device 178 operably connected to the controller 176. In such examples, the controller 152 of the cold planer 146 may utilize the communication device 154 to transmit one or more signals, and/or other information to the controller 176 of the mobile machine 150 via the network 138 and by way of the communication device 178. In such examples, upon receipt of the mobile machine travel path 214, the controller 176 may control the mobile machine 150 to traverses at least a portion of the mobile machine travel path 214. For example, the controller 176 may control the mobile machine 150 to traverses the first pass 218, the first turn 224, the second pass 220, the second turn 226, the third pass 222, and/or any other portions of the mobile machine travel path 214 determined at 506. In some examples, the controller 176 may control the mobile machine 150 to traverses one or more portions of the mobile machine travel path 214 without receiving input from one or more operators of the mobile machine 150. In such examples, the mobile machine 150 may comprise an autonomous mobile machine of the present disclosure.

At 510, the controller 152 of the cold planer 146 may receive sensor information associated with the work surface 158. For example, at 510, the controller 152 may receive sensor information collected, sensed, captured, and/or otherwise determined by at least one sensor 182 of the mobile machine 150 as the mobile machine 150 traverses, at least in part, the mobile machine travel path 214. As noted above, in some embodiments the sensor 182 may comprise at least one GPR carried by the mobile machine 150. In such examples, the GPR may be configured to determine a distance from the GPR to a surface (e.g., at least an uppermost surface) of an object disposed at least partly beneath the work surface 158 and/or the cut area 202. Such an object may reflect electromagnetic waves emitted by the sensor 182, and the sensor 182 may determine the distance (in the direction Y') to the surface of the object based at least partly on electromagnetic waves reflected by the surface of the object and received by the sensor 182. The sensor 182 may provide any such determined distances and/or other determined information to the controller 152 (e.g., via the network 138) at 510. In some examples, the sensor 182 may determine such distances continuously, substantially continuously, and/or at regular or irregular time intervals (e.g., every 0.5 seconds, every 1 second, every 2 seconds, every 5 seconds, every 10 seconds, every 15 seconds, and/or at any other regular or irregular time interval) as the mobile machine 150 traverses the work surface 158 along the mobile machine travel path 214. Accordingly, the sensor information received at 501 may comprise a plurality of sequential distances (in the direction Y') between the sensor 182 and the uppermost surfaces of various objects disposed beneath the work surface 158 and/or the cut area 202, as determined by the sensor 182 as the mobile machine 150 traverses the work surface 158 along the mobile machine travel path 214. In such examples, at 510 the controller 176 of the mobile machine 150 may control the communication device 178 to send one or more signals including such information to the controller 152, via the network 138. Such information may be used by the controller 152 to determine whether or not to modify the position of the rotor 156 (e.g., by raising the frame 159 of the cold planer 146 relative to the work surface 158) in order to prevent contact between the rotor 156 and one or more objects disposed beneath the work surface 158 and/or the cut area 202.

Additionally or alternatively, the sensor 182 may comprise one or more digital cameras, video cameras, thermal sensors, or other image capture devices. In an example embodiment, the sensor 182 may comprise an array of image capture devices configured to sense, capture, detect, and/or otherwise determine sensor information comprising one or more visual images and/or other digital images of the work surface 158 as the mobile machine 150 traverses a mobile machine travel path extending along the work surface 158. The sensor 182 may provide any such determined images to the controller 152 (e.g., via the network 138) at 510. Additionally or alternatively, the sensor 182 may comprise one or more magnetic sensors configured to emit and/or otherwise direct an electromagnetic field toward the work surface 158, and to determine a disturbance in the emitted electromagnetic field caused by an object disposed beneath the cut area and/or below the work surface 158. Such a magnetic sensor may be configured to determine the presence of such an object, and/or to determine a distance between the sensor 182 and at least an uppermost surface of such an object. The sensor 182 may provide any such determined distances and/or other determined information to the controller 152 (e.g., via the network 138) at 510.

Further, in any of the examples described herein, the sensor information received by the controller 152 at 510 may comprise first information indicative of a change in density associated with the sensed object. Such first information may be determined by, for example, the GPR described above, and such first information may be indicative of a change in density between the material 301 and different material forming the sensed object. Additionally, the sensor information received at 510 may include second information comprising at least one of image data received from an image capture device or magnetic field data received from a magnetic sensor.

In still further examples, the sensor information received at 510 may comprise first information determined by the sensor 182 as the mobile machine 150 traverses the first pass 218 of the mobile machine travel path 214, second information determined by the sensor 182 as the mobile machine 150 traverses the second pass 220 of the mobile machine travel path 214 adjacent to the first pass 218, third information determined by the sensor 182 as the mobile machine 150 traverses the third pass 222 of the mobile machine travel path 214 adjacent to the second pass 220, and/or any amount of additional information associated with and/or determined by the sensor 182 as the mobile machine 150 traverses a portion of the work surface 158. In any of the examples described herein, the controller 152 of the cold planer 146 may be configured to generate a worksite map 400 based at least partly on the sensor information (e.g., a plurality of sequential distances in the direction Y') received at 510.

At 512, the controller 152 may receive location information determined by the location sensor 180, and such location information may indicate locations of the mobile machine 150 as the mobile machine 150 traverses the mobile machine travel path 214. For example, the location sensor 180 carried by the mobile machine 150 may measure, detect, sense, calculate, and/or otherwise determine a plurality of GPS coordinates (e.g., longitude and latitude coordinates) indicative of respective locations of the mobile machine 150 as the mobile machine 150 traverses the mobile machine travel path 214. In such examples, the location sensor 180 may determine a plurality of sequential GPS coordinates indicative of the location of the mobile machine 150 continuously, substantially continuously, and/or at regular or irregular time intervals (e.g., every 0.5 seconds, every 1 second, every 2 seconds, every 5 seconds, every 10 seconds, every 15 seconds, and/or at any other regular or irregular time interval). For instance, the location information received at 512 may comprise a first plurality of GPS coordinates indicating respective locations of the mobile machine 150 as the mobile machine 150 traverses the first pass 218 of the mobile machine travel path 214, a second plurality of GPS coordinates indicating respective locations of the mobile machine 150 as the mobile machine 150 traverses the second pass 220, a third plurality of GPS coordinates indicating respective locations of the mobile machine 150 as the mobile machine 150 traverses the third pass 222, etc. At 512 the controller 176 of the mobile machine 150 may control the communication device 178 to send one or more signals including such location information to the controller 152 of the cold planer 146, via the network 138. It is understood that the controller 152 may determine the location (e.g., in three-dimensional space) of one or more objects disposed at least partly beneath the cut area 202 and/or the work surface 158 based at least partly on sensor information received (at 510) from the sensor 182 at a first time and indicative of a depth in the direction Y' of a surface of the object, and corresponding location information received (at 512) from the location sensor 180 and indicative of the GPS location of the mobile machine 150 at the first time. When taken together, the controller 152 may use the sensor information received (at 510) and corresponding location information received (at 512) to generate a three-dimensional worksite map 400.

At 514, the controller 152 may generate a worksite map 400 based at least partly on information received at 510 and/or at 512. For example, at 514 the controller 152 may generate a worksite map 400 based at least partly on the sensor information received at 510 and/or based at least partly on the location information received at 512. For example, when taken together, the controller 152 may use the sensor information received (at 510) and corresponding location information received (at 512) to generate a three-dimensional worksite map 400 indicating the position, location, orientation, and/or other characteristics of objects disposed beneath the work surface 158 and/or beneath the cut area 202. As noted above, an example worksite map 400 may comprise one or more text files, data files, video files, digital image files, and/or other electronic files providing information indicative of the cut area 202 to be formed by the cold planer 146, the work surface 158 on which the cut area 202 will be formed, the cold planer travel path 208, the mobile machine travel path 214, one or more objects disposed at least partly beneath the cut area 202, and/or other aspects of a particular worksite 200. For example, the worksite map 400 generated by the controller 152 at 514 may include location information comprising a first plurality of GPS coordinates indicating a location and/or extent of the first boundary 210 of the cut area 202, and a second plurality of GPS coordinates, indicating a location and/or extent of the second boundary 212 of the cut area 202. The worksite map 400 generated by the controller 152 at 514 may also include a plurality of GPS coordinates indicating respective locations of one or more objects (e.g., the first object 228, the second object 230, the third object 232, etc.) disposed at least partly beneath the work surface 158 and/or the cut area 202, and/or other information indicating respective distances in the direction Y' between the sensor 182 and/or the work surface 158 and substantially all points along one or more surfaces of such objects. For example, the worksite map 400 may include a plurality of GPS coordinates indicating respective locations of substantially all points along the surface 304, the surface 308, and/or the surface 309 of the third object 232 illustrated in FIG. 2. In such an example, the worksite map 400 may also include corresponding information indicating respective distances in the direction Y' between the sensor 182 and/or the work surface 158 and substantially all points along the surface 304, the surface 308, and/or the surface 309 of the third object 232.

In still further examples, the worksite map 400 may include location information indicative of the cold planer travel path 208 and/or of the mobile machine travel path 214. For example, the worksite map 400 may include a plurality of GPS coordinates indicating a location and/or extent of the cold planer travel path 208 extending along the work surface 158. In some examples, the worksite map 400 may also indicate various locations along the cold planer travel path 208 at which a position of the rotor 156 should be changed and/or otherwise modified relative to the frame 159 of the cold planer 146 and/or relative to the work surface 158. For example, the worksite map 400 may include first GPS coordinates indicating the first location 402 along the cold planer travel path 208 at which the rotor 156 should be raised, in a direction away from the work surface 158, in order to avoid contact with an object disposed at least partly beneath the cut area 202. In such examples, the worksite map 400 may also include second GPS coordinates indicating the second location 404 along the cold planer travel path 208 at which the rotor 156 may be lowered, in a direction toward the work surface 158, after the rotor 156 and/or the cold planer 146 has moved past such an object. In some examples, at least one of the front actuator assembly 167 and the rear actuator assembly 169 may be controlled to raise and/or lower the frame 159 of the cold planer 146 in order to change and/or otherwise control the position of the rotor 156 relative to the work surface 158. In some examples, at 514 the controller 152 may determine one or more locations (e.g., the first location 402) along the cold planer travel path 208 at which the rotor 156 should be raised by comparing the current position of the rotor 156 (e.g., the location in the direction Y' of the lowermost surface of the rotor 156 and/or teeth thereof) and the location (e.g., in the direction Y') of an uppermost surface of an object.

It is understood that the controller 152 may generate the worksite map 400 at 514 through extrapolation, using one or more trigonometric algorithms, using one or more neural networks and/or machine learning algorithms, using fuzzy logic, using one or more look-up tables, and/or through one or more additional methods. In an example embodiment, the controller 152 may have an associated memory and/or may have access to such a memory in which various extrapolation models, trigonometric algorithms, machine learning algorithms, look-up tables, and/or other components may be stored for determining the worksite map 400 based at least partly on information received at 502, 510, and/or 512.

At 516, the controller 152 of the cold planer 146 may output and/or otherwise provide the worksite map 400 to, for example, an operator of the cold planer 146. In some examples, at 516 the controller 152 may be configured to cause an image, graphical representation, GUI, or other such visualization of at least one of the cold planer travel path 208, the mobile machine travel path 214, or the worksite map 400 to be displayed via the console 168 of the cold planer 146. For example, the visualization of the worksite map 400 provided at 516 may comprise an interactive user interface generated and/or otherwise provided by the controller 152 via a display (e.g., a touch screen) of the console 168. In such examples, an operator of the cold planer 146 may utilize information included in the visualization of the worksite map 400 to assist in controlling operation of the cold planer 146. For example, as noted above, an example visualization of the worksite map 400 may include one or more images, icons, markings, and/or other visual indicia identifying an object (e.g., a first object 228) disposed at least partly beneath the cut area 202 and/or the work surface 158. Such an example visualization of the worksite map 400 may also include one or more hashmarks, lines, arrows, markings, images, icons, and/or other visual indicia indicating the first location 402 along the cold planer travel path 208 at which the rotor 156 should be raised (e.g., in the direction Y) in order to avoid contact with a first object 228, and the second location 404 along the cold planer travel path 208 at which the rotor 156 may be safely lowered (e.g., in the direction Y').

At 518, the controller 152 of the cold planer 146 may modify and/or otherwise control the position of the rotor 156, relative to the frame 159 of the cold planer 146 and/or relative to the work surface 158, based at least on partly on a location of the object (e.g., the first object 228) identified in the worksite map 400, as the cold planer 146 traverses at least a portion of the cold planer travel path 208. In any of the examples described herein, controlling the position of the rotor 156 at 518 may include controlling, maintaining, and/or modifying a depth of the rotor 156, in the direction Y and/or in the direction Y', relative to the work surface 158 as the cold planer 146 traverses the cold planer travel path 208. The controller 152 may control the position of the rotor 156 at 518 via at least one of the actuator assembly 163 associated with the rotor 156, the front actuator assembly 167, and the rear actuator assembly 169. In such examples, the cold planer 146 may operate in a semi-autonomous mode of operation and/or in a fully-autonomous mode of operation.

In the semi-autonomous mode of operation, the controller 152 may provide an indication to the operator of the cold planer 146, via a display of the console 168, that the position of the rotor 156 relative to the work surface 158 will be modified as the cold planer 146 reaches a location proximate (e.g., prior to) the first location 402. Such a location proximate the first location 402 may comprise a location that is, for example, approximately 25 feet, approximately 10 feet, approximately 5 feet, approximately 2 feet, approximately 1 foot, and/or any other distance from the GPS location of the object within which the controller 152 may be able to safely and reliably change the position of the rotor 156 relative to the work surface 158 in order to avoid contact with the object. In such examples, the operator may override the proposed movement of the rotor 156 relative to the work surface 158 by providing an input via the console 168 and/or via one or more controls of the cold planer 146. In the fully-autonomous mode of operation, on the other hand, the controller 152 may modify and/or otherwise control the position of the rotor 156, relative to the frame 159 of the cold planer 146 and/or relative to the work surface 158, based at least on partly on the location of the object (e.g., the first object 228) identified in the worksite map 400, without input from an operator. In particular, when operating in fully-autonomous mode, at 518 the controller 152 may raise the rotor 156, in a direction away from the work surface 158 (e.g., in the direction Y) when the cold planer 146 is disposed proximate the first location 402. Additionally, when operating in fully-autonomous mode at 518 the controller 152 may lower the rotor 156, in a direction toward the work surface 158 (e.g., in the direction Y') when the cold planer 146 is disposed proximate the second location 404. Such a location proximate the second location 402 may comprise a location that is, for example, approximately 25 feet, approximately 10 feet, approximately 5 feet, approximately 2 feet, approximately 1 foot, and/or any other distance beyond (e.g., after) the GPS location of the object within which the controller 152 may be able to safely and reliably lower the rotor 156 relative to the work surface 158.

In some examples, when the cold planer 146 is operating in fully-autonomous mode step 516 may be omitted.

Additionally, in any of the examples described herein, at 518 the controller 152 may determine, based at least partly on the information included in the worksite map 400 and a current position of the rotor 156, that maintaining the rotor 156 at a current position relative to the work surface 158, as the cold planer 146 traverses at least a portion of the cold planer travel path 208, will result in the rotor 156 contacting the object (e.g., the first object 228). For example, at 518 the controller 152 may compare the current position and/or depth of the rotor 156 (e.g., the location in the direction Y' of the lowermost surface of the rotor 156 and/or teeth thereof) to the location and/or depth (e.g., in the direction Y') of an uppermost surface of an object disposed beneath the work surface 158. In examples in which the depth (in the direction Y') of the lowermost surface of the rotor 156 is greater than or equal to the depth (in the direction Y') of an uppermost surface of the object as measured relative to the work surface 158, the controller 152 may determine, at 518, that traversing traverses at least a portion of the cold planer travel path 208 will result in the rotor 156 contacting the object. As a result, based at least partly on such a determination, at 518 the controller 152 may cause at least one of the front actuator assembly 167 and the rear actuator assembly 169 to raise the frame 159 of the cold planer 146 in the direction Y away from the work surface 158 so that contact with the object may be avoided. Additionally or alternatively, at 518 the controller 152 may generate an alert and/or may cause the cold planer 146 to stop based at least partly on such a determination. It is understood that such an alert may comprise an audible alert, a visible alert, a tactile alert, and/or other such indication that is output via the console 168 (e.g., a display of the console 168), an operator seat disposed in the operator station 166, a speaker disposed in the operator station 166, a light device disposed in the operator station 166, and/or by one or more other components of the cold planer 146. Such alerts, and/or stopping the cold planer 146 may further assist in avoiding contact between the rotor 156 and the object. Further, it is understood that in examples in which the depth (in the direction Y') of the lowermost surface of the rotor 156 is less than the depth (in the direction Y') of an uppermost surface of the object as measured relative to the work surface 158, the controller 152 may determine, at 518, that traversing traverses at least a portion of the cold planer travel path 208 will not result in the rotor 156 contacting the object. As a result, based at least partly on such a determination, at 518 the controller 152 may cause the position of the rotor 156 to remain unchanged (e.g., may maintain a current position of the rotor 156 relative to the work surface 158 and/or relative to the frame 159).

In still further examples, modifying and/or otherwise controlling the position of the rotor 156 at 518 may also include identifying a location of the object (e.g., the first object 228) based at least partly on a first type of sensor information received from the at least one sensor 182 at 510, and verifying the location of the object based at least partly on a second type of sensor information received from the at least one sensor 182 at 510. For example, at 510 the controller 152 may receive first sensor information from a GPR and/or other sensor 182 of the mobile machine 150 indicative of a change in density associated with the object (e.g., the first object 228). At 510, the controller 152 may also receive second sensor information from an image capture device and/or other sensor 182 of the mobile machine 150 comprising image data associated with the object and/or with the work surface 158. Further, at 510 the controller 152 may receive third sensor information from a magnetic sensor and/or other sensor 182 of the mobile machine 150 comprising magnetic field data associated with the object and/or with the work surface 158. In such examples, at 518 the controller 152 may identify the presence and/or the location of the object (e.g., the first object 228) based at least partly on, for example, the first sensor information determined by the GPR and indicative of the change in density associated with the object. In such examples, at 518 the controller 152 may confirm, corroborate, and/or otherwise verify the presence and/or location of the object based at least partly on the second sensor information comprising image data and/or based at least partly on the third sensor information comprising magnetic field data. For example, the controller 152 may be programmed and/or otherwise operable to modify and/or otherwise control the position of the rotor 156 at 518 when the presence and/or location of the object as determined by a GPR and/or other sensor 182 of the mobile machine 150 matches and/or otherwise corresponds to the presence and/or location of the object as determined by either the image capture device or the magnetic sensor of the sensor 182.

INDUSTRIAL APPLICABILITY

The present disclosure provides systems and methods for controlling various operations of a cold planer 146 at a worksite 200 such as a construction site, a road repair zone, a parking lot repair zone, an airport runway, and/or other such site. In particular, the systems and methods described herein may be used to actively control the position of a rotor 156 of the cold planer 146, relative to a frame 159 thereof and/or relative to a work surface 158 on which the cold planer 146 is disposed, in order to avoid contact between the rotor 156 and one or more objects disposed at least partly beneath a cut area or other portion of the work surface 158. As a result, the various systems and methods described herein may be used to avoid damage to the rotor 156 caused by such contact. By eliminating contact between the rotor 156 and such objects, the systems and methods described herein may also extend the useful life of the rotor 156, minimize downtime associated with maintenance and/or repair of the cold planer 146, and thereby improve worksite efficiency. By eliminating contact between the rotor 156 and such objects, the systems and methods described herein may also reduce maintenance and repair costs associated with operating the cold planer 146.

As noted above with respect to FIGS. 1-5, an example method of the present disclosure may include receiving, with a controller 152 of the cold planer 146, information indicative of a cold planer travel path 208 extending along a work surface 158, and determining a mobile machine travel path 214 extending along the work surface 158 based at least partly on such received information. The example method may also include receiving sensor information associated with the work surface 158. In such a method, the sensor information may comprise information determined by a GPR and/or other sensor 182 of a mobile machine 150 as the mobile machine 150 traverses the mobile machine travel path 214. In some examples, the mobile machine 150 may comprise a semi-autonomous or a fully-autonomous mobile machine 150. Such an example method also includes generating a worksite map 400 based at least partly on the sensor information. In such examples, the worksite map 400 may identify at least one object (e.g., a first object 228, a second object 230, a third object 232, etc.). In such examples, the object may be disposed at least partly beneath a cut area 202 to be formed by the cold planer 146 traversing the cold planer travel path 208. The method may also include controlling a position of a rotor 156 of the cold planer 146, relative to the work surface 158 and based at least partly on a location of the object identified in the worksite map 400, as the cold planer 146 traverses at least a portion of the cold planer travel path 208.

In any of the examples described herein, the controller 152 of the cold planer 146 may be configured to provide one or more of the cold planer travel path 208, the mobile machine travel path 214, the worksite map 400, the location of the object, and/or any other such information, to an operator of the cold planer 146 via one or more consoles 168 of the cold planer 146. As a result, an operator of the cold planer 146 may consume such information during one or more paving operations, and may utilize such information to modify various parameters of the cold planer 146 (e.g., to modify and/or otherwise control the position of the rotor 156). Additionally or alternatively, the controller 152 of the cold planer 146 may provide any such information to one or more other machines associated with the paving system 100 (e.g., the mobile machine 150) such that the operating parameters associated with such machines can be optimized. The controller 152 of the cold planer 146 may also be configured to provide such information to a mobile device and/or other electronic device 136 used by, for example, a foreman at the worksite 200 and/or to a controller 134 located remote from the worksite 200. Such information may be used by, for example, the foreman to improve the efficiency of various paving activities at the worksite 200. Thus, the example systems and methods described above may provide considerable cost savings, safety improvements, and paving efficiency improvements. The example systems and methods described herein may also reduce the time and labor required for various paving activities at the worksite.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
    receiving information indicative of substantially an entire cold planer travel path, the cold planer travel path extending along a work surface and defining a cut area to be formed by the cold planer;
    determining a mobile machine travel path using the received information, the mobile machine travel path extending along the work surface corresponding to the cut area;
    providing the mobile machine travel path to the autonomous mobile machine via a network;
    receiving sensor information associated with the work surface, wherein the sensor information is determined by at least a first sensor of an autonomous mobile machine as the autonomous mobile machine traverses the mobile machine travel path;
    receiving location information determined by a second sensor, wherein the location information indicates locations of the autonomous mobile machine as the autonomous mobile machine traverses the mobile machine travel path;
    generating a worksite map based at least partly on the sensor information and the location information, the worksite map identifying an object, wherein the object is disposed at least partly beneath the cut area; and
    controlling a position of a rotor of the cold planer, relative to the work surface and based at least partly on a location of the object identified in the worksite map, as the cold planer traverses at least a portion of the cold planer travel path.

2. The method of claim 1, wherein the information indicative of substantially the entire cold planer travel path comprises:
    a first plurality of global positioning system (GPS) coordinates indicating a location of a first boundary of the cut area, and
    a second plurality of GPS coordinates indicating a location of a second boundary of the cut area opposite the first boundary.

3. The method of claim 2, further comprising determining the cold planer travel path based at least partly on the first plurality of GPS coordinates and the second plurality of GPS coordinates.

4. The method of claim 1, wherein the cold planer travel path extends through substantially the entire cut area.

5. The method of claim 1, further comprising displaying a visualization of at least one of the cold planer travel path, the mobile machine travel path, or the worksite map via a console of the cold planer.

6. The method of claim 1, further comprising:
    determining that maintaining the rotor at a current position relative to the work surface, as the cold planer traverses the at least the portion of the cold planer travel path, will result in the rotor contacting the object; and
    at least one of generating an alert or causing the cold planer to stop based at least partly on determining that maintaining the rotor at the current position, as the cold planer traverses the at least the portion of the cold planer travel path, will result in the rotor contacting the object.

7. The method of claim 1, wherein:
    the worksite map indicates a first location along the cold planer travel path and a second location along the cold planer travel path spaced from the first location, and
    controlling the position of the rotor comprises:
        raising the rotor, in a direction away from the work surface, proximate the first location, and
        lowering the rotor, in a direction toward the work surface, proximate the second location.

8. The method of claim 1, wherein the mobile machine travel path comprises a number of passes along the work surface, and determining the mobile machine travel path comprises determining the number of passes based at least partly on:
    a width of a field of view of the at least one sensor, the width of the field of view extending in a direction substantially perpendicular to the mobile machine travel path, and
    a width of the cut area.

9. The method of claim 1, wherein the at least the first sensor is carried by the autonomous mobile machine and comprises at least one of a ground-penetrating radar, an image capture device, or a magnetic sensor.

10. The method of claim 1, wherein the sensor information is determined by the at least the first sensor at a first time, the method further comprising:
  determining the location of the object based at least partly on the location information indicating a location of the autonomous mobile machine corresponding to the first time.

11. A paving system, comprising:
  an autonomous mobile machine having a first sensor and a second sensor; and
  a cold planer having a rotor and a controller, the controller being configured to:
    receive information indicative of a cold planer travel path, the cold planer travel path defining a cut area to be formed by the cold planer;
    determine a mobile machine travel path using the received information, the mobile machine travel path extending along a work surface corresponding to the cut area;
    provide the mobile machine travel path to the autonomous mobile machine via a network;
    receive sensor information associated with the work surface, wherein the sensor information is determined by the first sensor as the autonomous mobile machine traverses the mobile machine travel path;
    receive location information determined by the second sensor, wherein the location information indicates locations of the autonomous mobile machine as the autonomous mobile machine traverses the mobile machine travel path;
    generate a worksite map based at least partly on the sensor information and the location information, the worksite map identifying an object disposed at least partly beneath the cut area; and
    control a position of the rotor, relative to the work surface and based at least partly on a location of the object identified in the worksite map, as the cold planer traverses at least a portion of the cold planer travel path.

12. The system of claim 11, wherein the sensor information comprises first information indicative of a change in density associated with the object, and second information comprising at least one of image data or magnetic field data.

13. The system of claim 12, wherein controlling the position of the rotor includes identifying the location of the object based at least partly on one of the first information or the second information, and verifying the location of the object based at least partly on the other of the first information or the second information.

14. The system of claim 11, wherein
  a field of view of the first sensor has a width, extending in a direction substantially perpendicular to the mobile machine travel path, less than approximately 30 inches, and a depth, extending in a direction toward the work surface, greater than approximately 18 inches, and
  the mobile machine travel path is determined based at least in part on the width of the field of view and the depth of the field of view.

15. The system of claim 11, wherein the sensor information comprises first information determined by the first sensor as the autonomous mobile machine traverses a first pass of the mobile machine travel path, and second information determined by the first sensor as the autonomous mobile machine traverses a second pass of the mobile machine travel path adjacent to the first pass, the controller being configured to generate the worksite map based at least partly on the first information and the second information.

16. The system of claim 15, wherein the first information comprises a first plurality of GPS coordinates indicating locations of the autonomous mobile machine as the autonomous mobile machine traverses the first pass, and a second plurality of GPS coordinates indicating locations of the autonomous mobile machine as the autonomous mobile machine traverses the second pass.

17. A cold planer, comprising:
  a rotor;
  a communication device; and
  a controller in communication with the communication device, the controller being configured to:
    receive information indicative of a cold planer travel path, the cold planer travel defining a cut area to be formed by the cold planer;
    determine a mobile machine travel path using the received information, the mobile machine travel path extending along a work surface corresponding to the cut area;
    provide the mobile machine travel path to the autonomous mobile machine with the communication device;
    receive, with the communication device, sensor information associated with the work surface, wherein the sensor information is determined by the first sensor as the autonomous mobile machine traverses the mobile machine travel path;
    receive, with the communication device, location information determined by the second sensor, wherein the location information indicates locations of the autonomous mobile machine as the autonomous mobile machine traverses the mobile machine travel path;
    generate a worksite map based at least partly on the sensor information and the location information, the worksite map identifying an object disposed at least partly beneath the cut area; and
    modify a position of the rotor, relative to the work surface and based at least partly on a location of the object identified in the worksite map, as the cold planer traverses at least a portion of the cold planer travel path.

18. The cold planer of claim 17, further comprising a front actuator assembly operably connected to the controller and a rear actuator assembly operably connected to the controller, at least one of the front actuator assembly and the rear actuator assembly being configured to move a frame of the cold planer between a first position and a second position further from the work surface than the first position.

19. The cold planer of claim 17, wherein the controller is configured to:
  determine that maintaining the rotor at a current position relative to the work surface, as the cold planer traverses the at least the portion of the cold planer travel path, will result in the rotor contacting the object; and
  at least one of generate an alert or cause the cold planer to stop based at least partly on determining that maintaining the rotor at the current position, as the cold planer traverses the at least the portion of the cold planer travel path, will result in the rotor contacting the object.

20. The cold planer of claim 17, wherein the controller is configured to cause a visualization of at least one of the cold planer travel path, the mobile machine travel path, or the worksite map to be displayed via a console of the cold planer, and wherein the cold planer travel path is indicative of substantially an entire length of the cut area.

* * * * *